United States Patent
Ikeno et al.

(10) Patent No.: US 8,363,286 B2
(45) Date of Patent: Jan. 29, 2013

(54) IMAGE READING DEVICE WITH ADF FEED BEING ORTHOGONAL TO ORIGINAL PLACEMENT ON ORIGINAL PLACEMENT AREA

(75) Inventors: Takahiro Ikeno, Seto (JP); Yoshinori Osakabe, Seto (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 881 days.

(21) Appl. No.: 11/512,422

(22) Filed: Aug. 30, 2006

(65) Prior Publication Data

US 2007/0223060 A1  Sep. 27, 2007

(30) Foreign Application Priority Data

Aug. 30, 2005 (JP) .................................. 2005-248830

(51) Int. Cl.
*H04N 1/04* (2006.01)
(52) U.S. Cl. ........................................................ 358/474
(58) Field of Classification Search .................. 358/474, 358/496, 505; 399/367
See application file for complete search history.

(56) References Cited

U.S. PATENT DOCUMENTS

| | | | | |
|---|---|---|---|---|
| 4,204,727 A | * | 5/1980 | Tates | 399/403 |
| 4,972,235 A | * | 11/1990 | Iwamoto et al. | 399/370 |
| 5,490,667 A | * | 2/1996 | Nagashima et al. | 271/225 |
| 5,564,686 A | * | 10/1996 | Horng | 271/4.01 |
| 6,321,063 B1 | * | 11/2001 | Tanaka et al. | 399/367 |
| 6,678,071 B1 | * | 1/2004 | Saito et al. | 358/1.2 |
| 2003/0063336 A1 | * | 4/2003 | Cho | 358/498 |

FOREIGN PATENT DOCUMENTS

| | | |
|---|---|---|
| JP | 2002-290680 | 10/2002 |
| JP | 2005-175914 | 6/2005 |

OTHER PUBLICATIONS

JP 2002-290680, Oct. 2002, Japan, Shomura.*

* cited by examiner

*Primary Examiner* — Benny Q Tieu
*Assistant Examiner* — Eric A Rust
(74) *Attorney, Agent, or Firm* — Banner & Witcoff, Ltd.

(57) ABSTRACT

An image reading device includes: an original table having a stationary original reading area and a moving original reading area on its top surface; an image reading unit provided inside the original table and moving the reading line in the direction of the width of the stationary original reading area and to the moving original reading area with the direction of the length of the stationary original reading area as the reading line; an original cover openably and closably provided on the original table so as to cover at least the stationary original reading area; and an ADF having an original conveyance path leading from an original tray by way of the moving original reading area to an original output tray. The image reading device reads originals of sizes larger than the readable stationary original size without any size increase of the device.

20 Claims, 17 Drawing Sheets

IMAGE READING DEVICE WITH ADF FEED BEING ORTHOGONAL TO ORIGINAL PLACEMENT ON ORIGINAL PLACEMENT AREA

CROSS-REFERENCE TO RELATED APPLICATIONS

This Nonprovisional application claims priority under 35 U.S.C. §119(a) on Patent Application No. 2005-248830 filed in Japan on Aug. 30, 2005, the entire contents of which are hereby incorporated by reference.

BACKGROUND

The present invention relates to an image reading device capable of image reading from a stationary original and image reading from a moving original.

Conventionally, image reading devices have been known that are capable of image reading from a stationary original and image reading from a moving original. Image reading from a stationary original is performed by reciprocating an image sensor with respect to a platen glass where the original is placed. Such image reading is known, for example, as an image reading device called a flatbed type. On the other hand, to perform image reading from a moving original, the original is conveyed to the reading position of the image sensor by an original conveying mechanism that conveys the original along a predetermined conveyance path, and image reading is performed when the original passes through the reading position. As such an original conveying mechanism, for example, one called an auto document feeder (hereinafter, referred to as "ADF") is known.

FIGS. 1 and 2 are perspective views showing a conventional image reading device capable of image reading from a stationary original and image reading from a moving original. A multi function device (MFD) 90 integrally comprises a printer unit 91 below and a scanner unit 92 above, and has a printer function, a scanner function, and a copier function. The scanner unit 92 of the multi function device 90 is an image reading device that performs image reading from a stationary original and image reading from a moving original.

In the scanner unit 92, an original cover 94 is openably and closably provided on an original table 93. A platen glass 95 is disposed on the top surface of the original table 93. When a stationary original is read, the original is placed on the platen glass 95. An image reading unit having an image sensor is provided inside the original table 93. As the image sensor, for example, a contact image sensor (hereinafter, referred to as "CIS") is used. By this image sensor being moved parallel to the platen glass 95, image reading from the original placed on the platen glass 95 is performed.

As shown in FIG. 1, the original cover 94 has an ADF 96. The ADF 96 conveys the original along a predetermined conveyance path from an original tray 97 to an output tray 98. These two trays are disposed one on the other on the top surface of the original cover 94. As shown in FIG. 2, an opening 99 for reading a moving original is formed on the lower surface of the original cover 94. The original conveyed along the conveyance path of the ADF 96 is exposed to the platen glass 95 when passing through the opening 99. A partial area of the platen glass 95 opposed to the opening 99 when the original cover 94 is closed is a reading surface for reading a moving original. When a moving original is read, the image sensor is stopped below the reading surface. Then, the image of the original passing through the opening 99 while being conveyed by the ADF 96 is read by the image sensor.

The CIS used as the image sensor is moved in a direction orthogonal to a reading line with one direction of the platen glass 95, that is, the direction of the width or the depth of the platen glass 95 as the reading line. In the scanner unit 92, to read the original passing through the opening 99 by the ADF 96, the image sensor is disposed so that the same direction as the direction of the length of the opening 99, that is, the direction of the depth of the platen glass 95 is the reading line. On the other hand, in image reading devices of the flatbed type not having the ADF, the image sensor is sometimes disposed so that the direction of the length of the platen glass is the reading line (see, for example, Japanese Patent Application Laid-Open No. 2002-290680).

SUMMARY

In image reading devices of the flatbed type that perform image reading from a stationary original, it is necessary that all the area of the original to be read be on the image reading area of the platen glass. In other words, in image reading devices of the flatbed type, image reading cannot be performed from the part of the original that lies outside the image reading area of the platen glass. Therefore, the size of the platen glass coincides with the maximum original size that can be read. For example, the platen glass used for image reading devices whose maximum readable size is A3 size has an area slightly larger than A3 size. On the other hand, the platen glass used for image reading devices whose maximum readable size is A4 size has an area slightly larger than A4 size.

It is demanded that MFDs having the printer function, the scanner function, the copier function, and the like be multi-functional and small-sized. Therefore, many scanner units used for MFDs adopt, as the maximum readable size, A4 size the frequency of use of which is comparatively high. Images read by image reading devices are easy to be enlarged and reduced by using an image processing program or the like. Therefore, it can be performed to reduce an image read by the scanner unit of the MFD and print it in an arbitrary layout on a sheet of a desired size. Considering such a function, it is convenient if an image larger than A4 size can be read by the scanner unit even if the maximum reading sheet size that can be printed by the printer unit is A4 size.

The present invention is made in view of such circumstances, and an object thereof is to provide an image reading device capable of reading originals of sizes larger than the readable stationary original size without any size increase of the image reading device.

An image reading device is provided with: an original table having a stationary original reading area that is rectangular when viewed two-dimensionally and where a transparent member is exposed from a top surface thereof and a moving original reading area where the transparent member is exposed along a direction of a length of the stationary original reading area; a line sensor provided inside the original table, and moving a reading line in a direction of a width of the stationary original reading area and to the moving original reading area with the direction of the length of the stationary original reading area as the reading line; a cover member openably and closably provided on the original table so as to cover at least the stationary original reading area; and an original conveying mechanism having a conveyance path leading from an original placement portion where an original to be read is placed by way of the moving original reading area in a direction orthogonal to a direction of a length of the moving original reading area to an original output portion where the original is outputted.

The stationary original reading area that is rectangular when viewed two-dimensionally and the moving original reading area formed along the direction of the length of the stationary original reading area are formed on the top surface of the original table. The original from which image reading is performed is placed on the stationary original reading area. The line sensor provided inside the original table reads the image of the original by moving its reading line in the direction of the width of the stationary original reading area with the direction of the length of the stationary original reading area as the reading line. That is, the direction of the length of the stationary original reading area is the main scanning direction of the line sensor, and the direction of the width thereof is the sub scanning direction of the line sensor. Thereby, image reading from originals of sizes that can be placed on the stationary original reading area is performed.

The original conveying mechanism conveys the original placed on the original placement portion by way of the moving original reading area to the original output portion. In the moving original reading area, the original is conveyed in the direction orthogonal to the direction of the length thereof. The line sensor is situated below the moving original reading area, and the image of the original passing through the moving original reading area is read. The moving original reading area is formed along the direction of the length of the stationary original reading area, and the direction of the length of the stationary original reading area is the same as the direction of the reading line of the line sensor. That is, the direction of the length of the moving original reading area is the main scanning direction of the line sensor, and the conveyance direction is the sub scanning direction of the line sensor. Thereby, image reading from originals of widths that lie within the length of the moving original reading area is performed.

In such an image reading device, the stationary original reading area that is rectangular when viewed two-dimensionally and the moving original reading area formed along the direction of the length of the stationary original reading area are formed on the top surface of the original table, and the line sensor provided inside the original table performs image reading from the original placed on the stationary original reading area with the direction of the length of the stationary original reading area as the main scanning direction and the direction of the width thereof as the sub scanning direction. Thereby, the movement width of the reading line of the line sensor with respect to the stationary original reading area is reduced. Moreover, since in the moving original reading area, the original is conveyed by the original conveying mechanism in the direction orthogonal to the direction of the length of the moving original reading area and image reading from the conveyed original is performed with the direction of the length of the moving original reading area as the main scanning direction of the line sensor and the conveyance direction as the sub scanning direction, image reading from originals of widths that lie within the length of the moving original reading area is performed. Thereby, image reading from originals of large sizes that cannot be placed on the stationary original reading area can be performed.

The above and further objects and features of the invention will more fully be apparent from the following detailed description with accompanying drawings.

DETAILED DESCRIPTION OF THE EXEMPLARY EMBODIMENTS

Hereinafter, the present invention will be described in detail with reference to the drawings showing embodiments thereof. It is to be noted that the embodiments shown below are merely examples and may be modified as appropriate without departing from the scope of the invention.

First Embodiment

Figure 1:
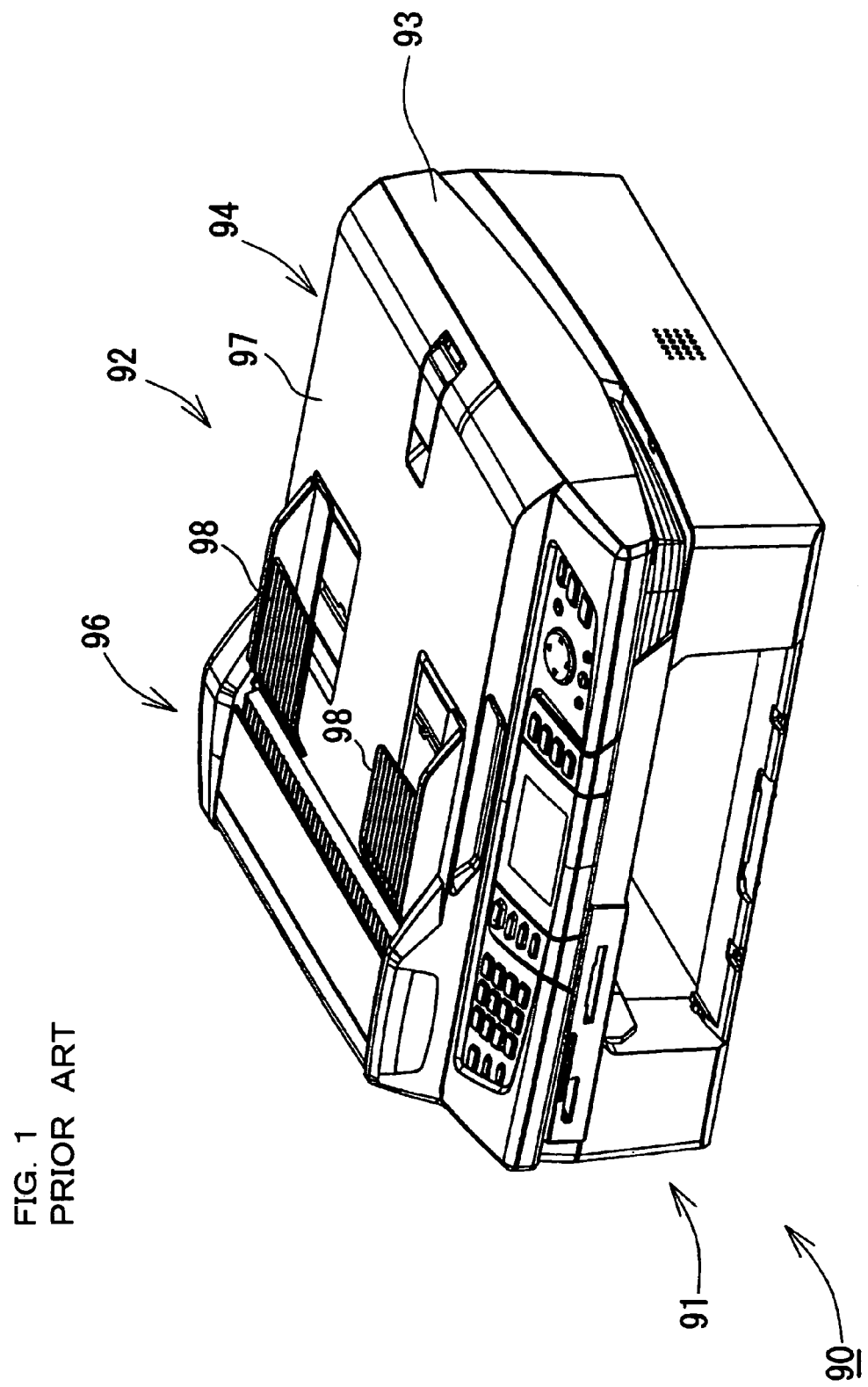
FIG. 1 is a perspective view showing the external structure of the multi function device having the conventional image reading device.
Figure 2:
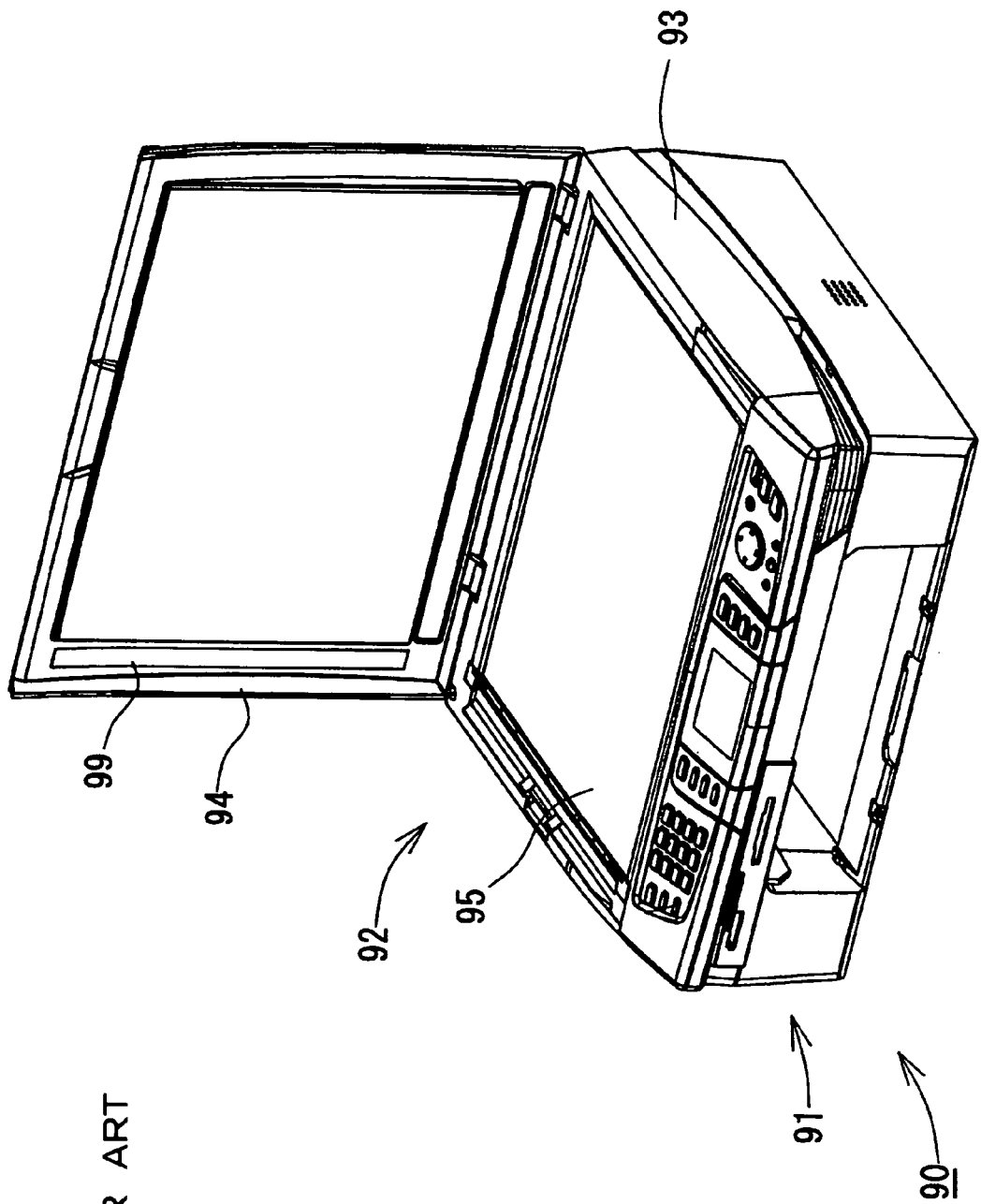
FIG. 2 is a perspective view showing the external structure of the multi function device having the conventional image reading device.
Figure 3:
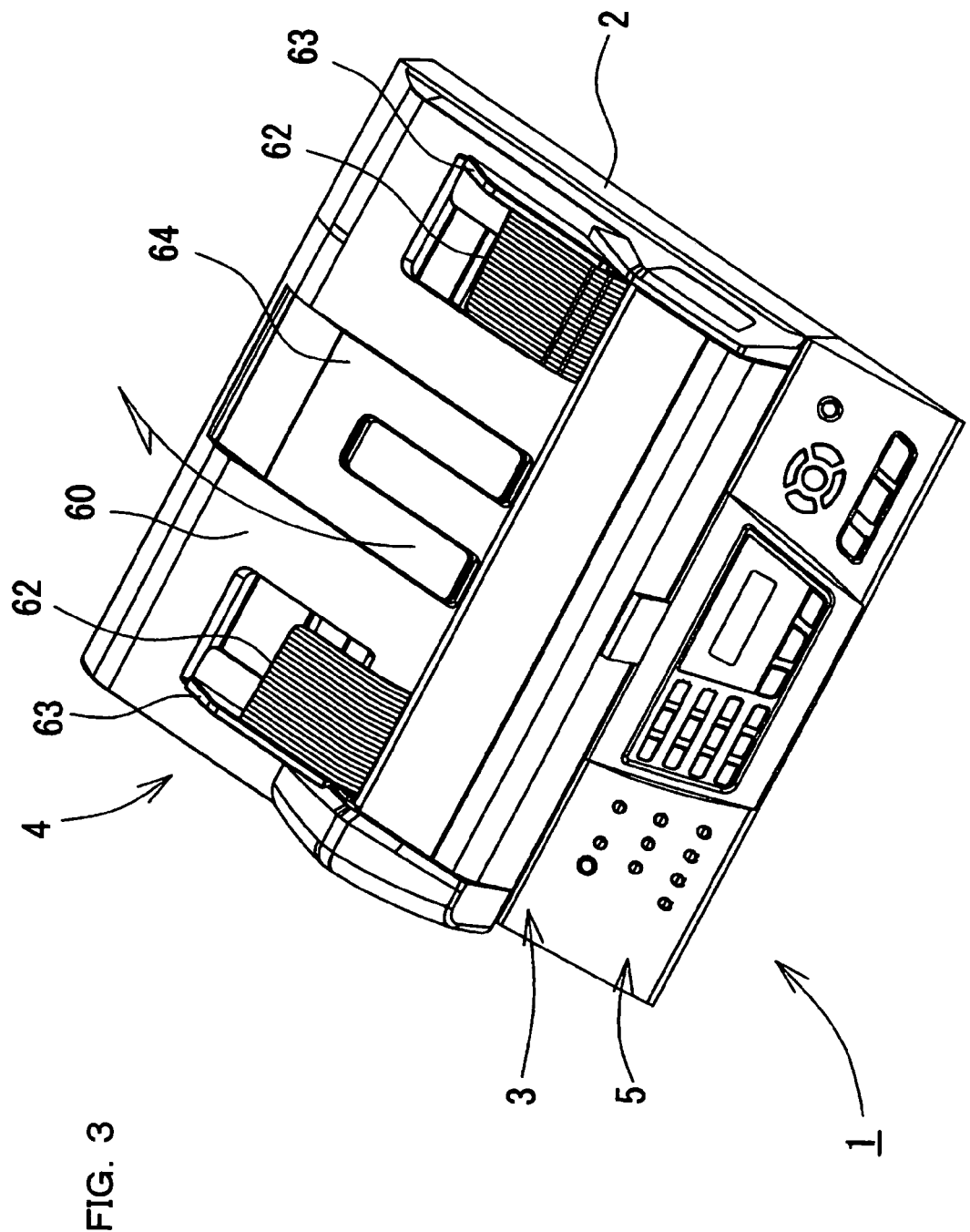
FIG. 3 is a perspective view showing the external structure of an image reading device according to a first embodiment.

FIG. 3 is a perspective view showing the external structure of an image reading device 1 according to a first embodiment. In the image reading device 1, an original cover 4 (cover member) having an ADF 3 is openably and closably attached through hinges on the back side to an original table 2 functioning as an FBS (flatbed scanner).

An operation panel 5 is provided on the front side of the image reading device 1. The operation panel 5 has various operation keys and a liquid crystal display. A user inputs a desired instruction by using the operation panel 5. The image reading device 1 performs a predetermined operation in response to a predetermined input. The image reading device 1 operates not only on instructions inputted to the operation panel 5 but also on instructions transmitted, when the image reading device 1 is connected to a computer, from the computer through a scanner driver.

The image reading device 1 is mainly connected to a non-illustrated computer, and transfers the read image data to the computer. It is to be noted that the image reading device 1 is merely an embodiment and may be implemented, for example, as the scanner unit in an MFD having the printer function, the scanner function, the copier function, and the like, or as the image reading unit of a copier.

Figure 4:
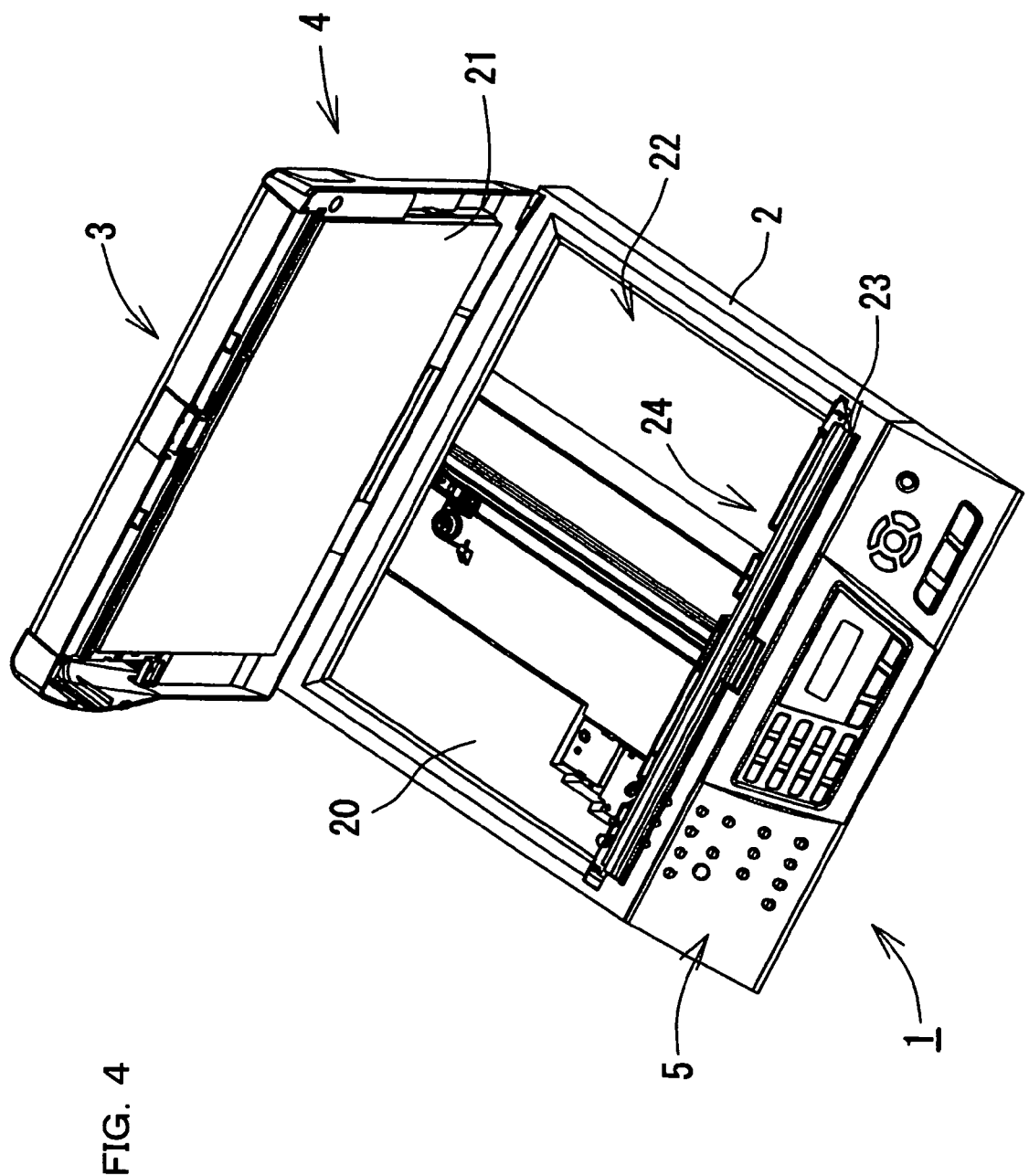
FIG. 4 is a perspective view showing the image reading device in a condition where an original cover is opened with respect to an original table.

FIG. 4 shows the image reading device 1 in a condition where the original cover 4 is opened with respect to the original table 2. As shown in the figure, a platen glass 20 (transparent member) is disposed on the top surface of the original table 2. The area where the platen glass 20 is exposed from the top surface of the original table 2 is a stationary original reading area 22 and a moving original reading area 23. The stationary original reading area 22 is an area where the original is placed and read when the image reading device 1 is used as a flatbed scanner. The moving original reading area 23 is an area where the original passes when image reading is performed by using the ADF 3 of the image reading device 1.

The stationary original reading area 22 is rectangular when viewed two-dimensionally, and occupies most of the top surface of the original table 2. The direction of the length of the stationary original reading area 22 is the direction of the width of the device. The maximum size that can be placed on the stationary original reading area 22 is A4 size. That is, when used as an FBS, the image reading device 1 can read originals of up to A4 size. An A4-size original is placed on the platen glass 20 so that the direction of the length thereof coincides with the direction of the length of the stationary original reading area 22, that is, with the direction of the length of the original as the direction of the width of the device.

The moving original reading area 23 is formed on the device front side of the stationary original reading area 22 on the top surface of the original table 2. The moving original reading area 23 is an area elongated in the direction of the length of the stationary original reading area 22. When image reading is performed by using the ADF 3 of the image reading device 1, the original is conveyed so as to pass through the moving original reading area 23.

When the original cover 4 is closed as shown in FIG. 3, the stationary original reading area 22 and the moving original reading area 23 are covered with the original cover 4. To press the original placed on the stationary original reading area 22, a pressing member 21 comprising a sponge, a white board and the like is disposed on the lower surface of the original cover 4.

An image reading unit 24 is incorporated in the original table 2. In the image reading by the FBS, the image reading unit 24 is reciprocated along the platen glass 20 to thereby perform image reading from the original placed on the stationary original reading area 22. When the ADF 3 is used, the image reading unit 24 moves to a position where the original passing through the moving original reading area 23 can be read, and stops.

Figure 5:
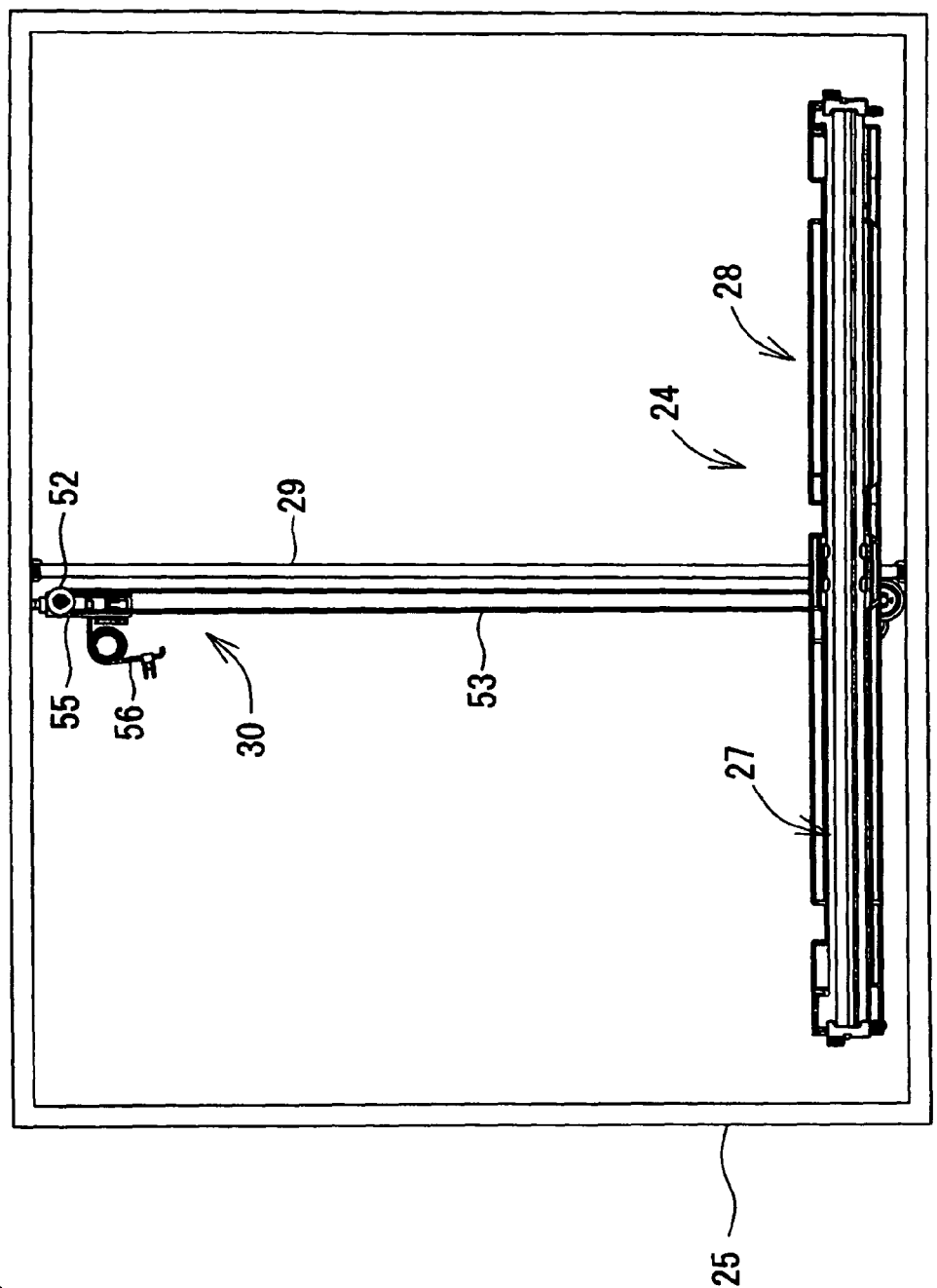
FIG. 5 is a plan view showing the internal structure of the original table.

FIG. 5 is a plan view showing the internal structure of the original table 2, and depicts a condition where an upper cover 26 (see FIG. 8) of the casing of the original table 2 is detached. The image reading unit 24 is disposed within a lower frame 25 of the casing of the original table 2. The upper cover 26 where an opening for exposing the platen glass 20 is formed is joined to the lower frame 25 to thereby constitute the casing of the original table 2. The lower frame 25 and the upper cover 26 are both made of a synthetic resin. The lower frame 25 has a partition plate for partitioning into a part where the image reading unit 24 is disposed and a part where the board of the operation panel 5 and the like are disposed, supporting ribs for supporting the platen glass 20, bosses for screwing various members, and through holes for electrical wiring, and these components are omitted in FIGS. 5 and 6 since they are designed as appropriate according to the embodiment of the original table 2.

The image reading unit 24 comprises a CIS 27 (line sensor), a carriage 28, a guide shaft 29, and a belt driving mechanism 30.

Figure 6:
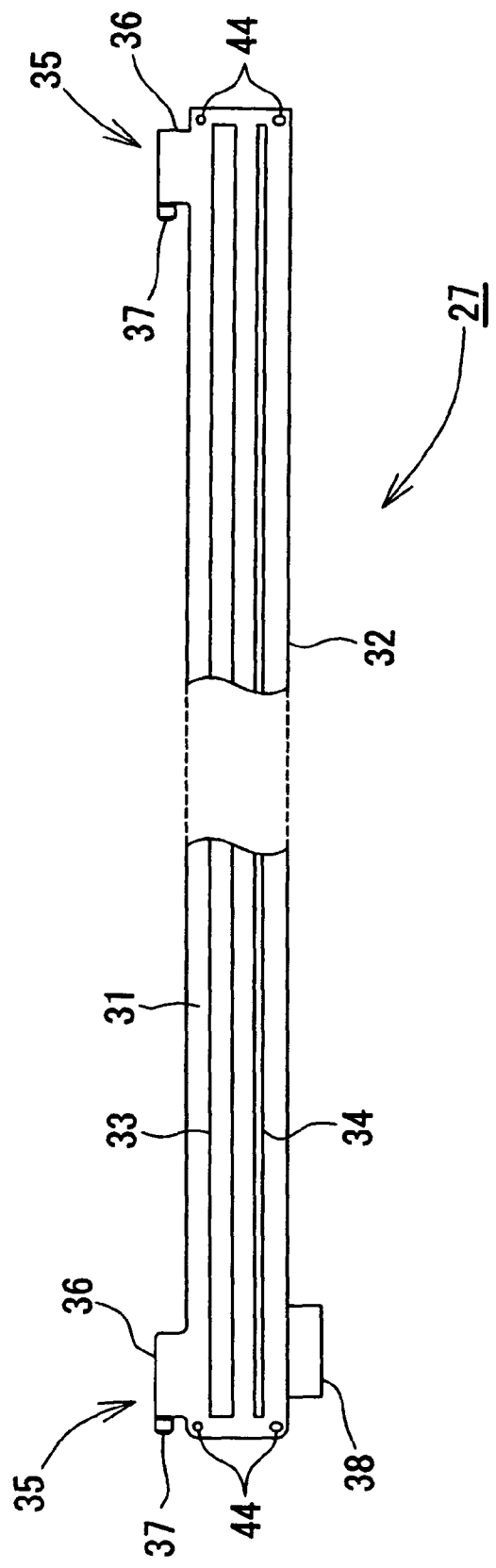
FIG. 6 is a plan view showing the structure of a CIS.

FIG. 6 is a plan view showing the structure of the CIS 27. As shown in FIG. 6, the CIS 27 has a casing 32 the general shape of which is an elongated rectangular parallelepiped and the top surface 31 of which is an elongated plane being rectangular when viewed two-dimensionally. On the top surface 31 of the casing 32, a light guide 33 that guides the light of the LED incorporated in the casing 32 is disposed in the direction of the length of the casing 32 substantially at the same width. The light guide 33 makes the light of the LED exit in the direction of the length toward the top surface 31 of the casing 32 of the CIS 27. On the top surface 31 of the casing 32, a plurality of condenser lenses 34 are arranged in a row in the direction of the length of the casing 32 substantially at the same width so as to be parallel to the light guide 33. Inside the casing 32, a plurality of light receiving elements are arranged in a row immediately below the condenser lenses 34 in the same direction as that of the condenser lenses 34 substantially at the same width as that of the casing 32. The light emitted from the LED is applied to the original on the platen glass 20, and the light reflected therefrom is condensed on the light receiving elements by the condenser lenses 34. The light receiving elements are so-called photoelectric conversion elements that output an electric signal responsive to the intensity of the reflected light, and output an electric signal responsive to the reflected light intensity. The direction of the length of the casing 32 of the CIS 27 is the main scanning direction in image reading. The length in the main scanning direction, that is, the length in the direction of the length of the casing 32 of the CIS 27 is a length corresponding to a medium to be read of the maximum size that can be read by the CIS 27. The CIS 27 performs image reading with the direction of the length of the casing 32 as the reading line, and outputs an electric signal for each reading line.

Positioning portions 35 are provided on the casing 32 of the CIS 27. The positioning portions 35 perform positioning in the sub scanning direction of the CIS 27, that is, in the direction orthogonal to the main scanning direction with respect to the carriage 28. The positioning portions 35 each have a base 36 provided so as to protrude from one end in the direction of the width of the casing 32 of the CIS 27 and a shaft 37 provided so as to protrude from the base 36 in the direction of the length. The shafts 37 engage with bearings 41 of the carriage 28 described later for positioning in the sub scanning direction of the CIS 27. A convex portion 38 is formed on the other end in the direction of the width of the casing 32 of the CIS 27. The convex portion 38 is fitted in a concave portion 42 of the carriage 28 described later for positioning in the main scanning direction of the CIS 27.

Figure 7:
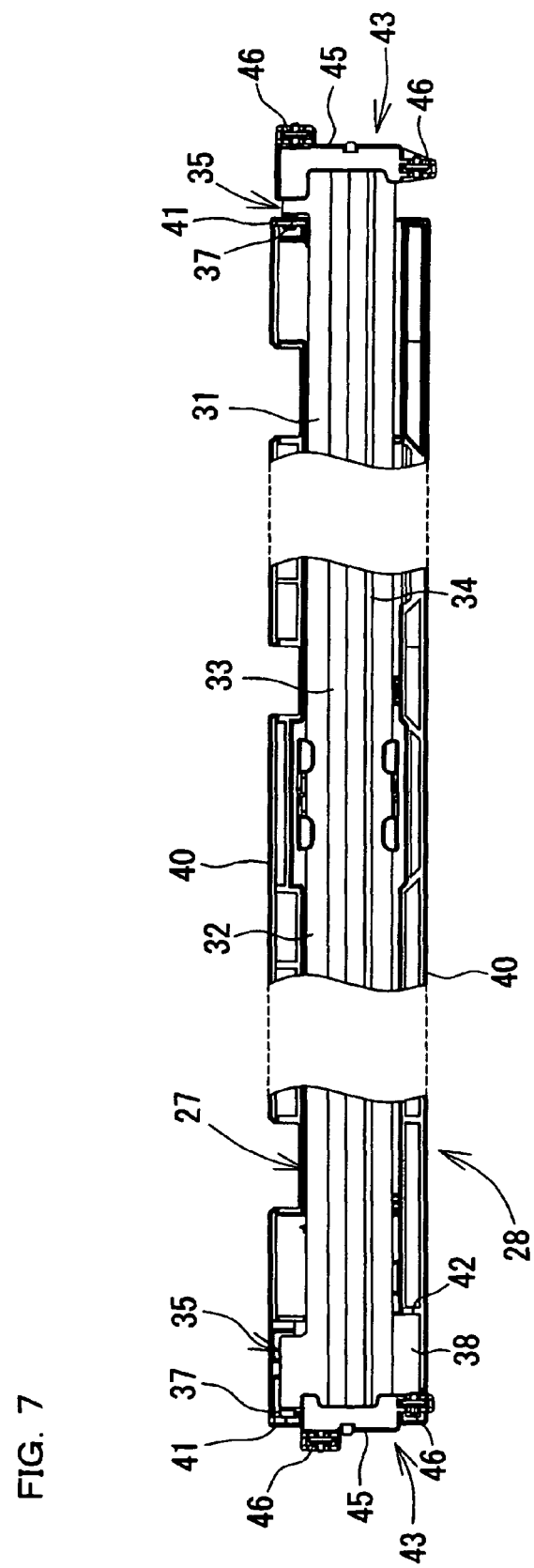
FIG. 7 is a plan view showing the structure of a carriage provided with the CIS.

FIG. 7 is a plan view showing the carriage 28 provided with the CIS 27. As shown in FIG. 7, the carriage 28 has a container shape on the top surface of which the CIS 27 is mounted. The carriage 28 has a bottom 39 (see FIG. 8) and walls 40 provided so as to rise upward from both ends in the sub scanning direction of the bottom 39. The CIS 27 is housed in a space defined by the bottom 39 and the walls 40. No wall is provided on both ends in the main scanning direction of the bottom 39, and one end of the casing 32 of the CIS 27 protrudes from the side of the direction of the length of the carriage 28. The top end of the carriage 28 is open, and the top surface 31 of the CIS 27 mounted on the carriage 28 is exposed.

The bearings 41 engaged with the positioning portions 35 of the CIS 27 are formed on one of the walls 40. The bearings 41 are elongated holes that are vertical when the direction toward the bottom 39 is regarded as downward, and the shafts 37 of the positioning portions 35 are inserted into the elongated holes to thereby engage the positioning portions 35 and the bearings 41 with each other. The bearings 41 are disposed in positions corresponding to the pair of positioning portions 35. The concave portion 42 is formed on the inner surface of the other of the walls 40 so as to correspond to the convex portion 38. The concave portion 42 and the convex portion 38 of the CIS 27 engage with each other for positioning, in the main scanning direction, of the CIS 27 with respect to the carriage 28.

While in the present embodiment, the positioning in the sub scanning direction is performed by the positioning portions 35 provided on the casing 32 of the CIS 27 and the positioning in the main scanning direction is performed by the convex portion 38, the positioning of the CIS 27 with respect to the carriage 28 by these portions is merely an example, and the configuration, the positioning direction and the like may be modified.

A roller unit 43 is provided on each end in the direction of the length of the CIS 27. As shown in FIG. 6, a positioning hole 44 for positioning of the roller unit 43 is provided on each end of the top surface 31 of the CIS 27. Pins provided in a protruding condition on the bottom surface of the roller units 43 are inserted in the positioning holes 44 to thereby position and fix the roller units 43 at both ends of the CIS 27 as shown in FIG. 7. In each roller unit 43, a pair of rollers 46 is supported by a frame 45 so that they can roll in the direction of the width of the CIS 27. The rollers 46 evenly protrude from the top surface 31 of the CIS 27, and the gap between the top surface 31 of the CIS 27 and the lower surface of the platen glass 20 is maintained constant by the rollers 46 abutting on the lower surface of the platen glass 20. The rolling of the rollers 46 makes smooth the movement of the CIS 27 with respect to the platen glass 20.

Figure 8:
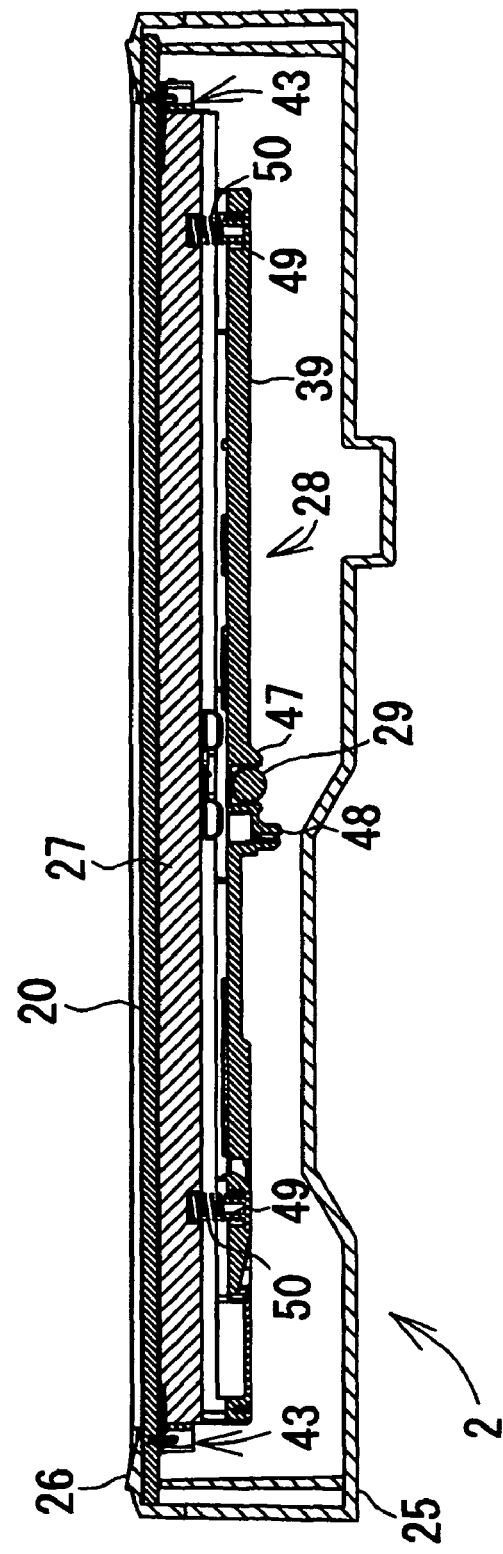
FIG. 8 is a longitudinal cross-sectional view showing the internal structure of the original table.

FIG. 8 is a longitudinal cross-sectional view showing the internal structure of the original table 2. As shown in FIG. 8, the carriage 28 is provided with the CIS 27 so as to support it on the upper side thereof. A shaft bearing 47 engaged so as to be fitted on the guide shaft 29 from above is formed on the lower surface of the carriage 28. The shaft bearing 47 and the guide shaft 29 engage with each other to thereby support the carriage 28 on the guide shaft 29, and the carriage 28 is slidable in the axial direction of the guide shaft 29. A belt grasping portion 48 protrudes downward on a side of the shaft bearing 47. When the belt grasping portion 48 grasps a timing belt 53 of the belt driving mechanism 30, the timing belt 53 and the carriage 28 are coupled together. Thereby, the driving force is transmitted from the belt driving mechanism 30 to the carriage 28, so that the carriage 28 moves on the guide shaft 29.

A spring bearing 49 is formed in two positions on the right and left on the inner surface of the carriage 28. Coil springs 50, which are positioned by the spring bearings 49, are interposed between the CIS 27 and the carriage 28. The coil springs 50 bring the CIS 27 mounted on the carriage 28 into close contact with the lower surface of the platen glass 20 so as to be pressed thereagainst through the roller units 43. The CIS 27 is movable vertically with respect to the carriage 28 by an elastic deformation of the coil springs 50. Therefore, when the platen glass 20 bends, the CIS 27 vertically moves so as to follow the bending.

Figure 9:
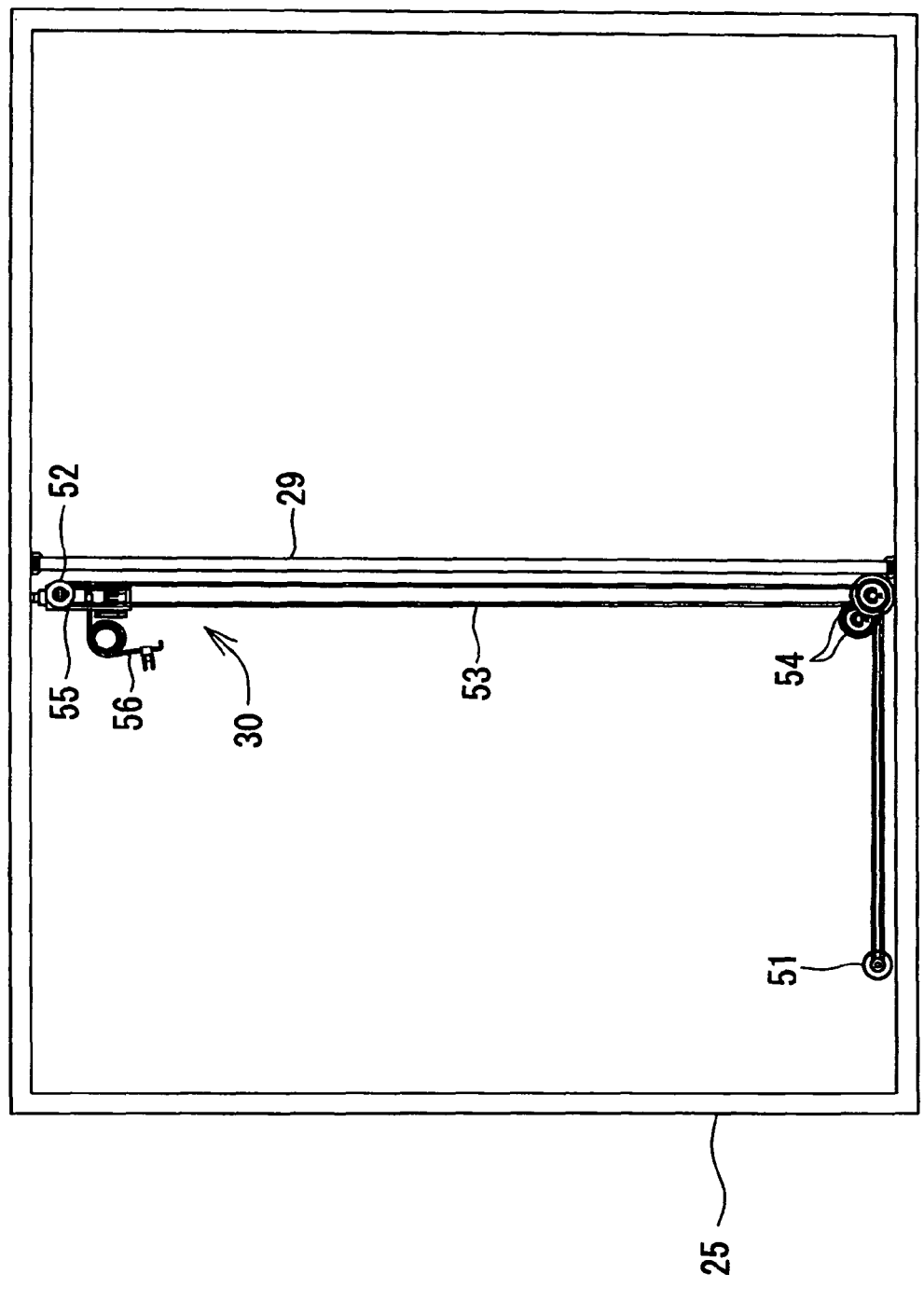
FIG. 9 is a plan view showing the structure of a belt driving mechanism.

FIG. 9 is a plan view showing the structure of the belt driving mechanism 30, and depicts a condition where the upper cover 26, the carriage 28 and the like of the casing of the original table 2 are detached. As shown in FIG. 9, in the belt driving mechanism 30, the timing belt 53 is entrained around a driving pulley 51 and a driven pulley 52. The timing belt 53 is an endless belt having teeth on the inside thereof. The rotation of the motor is outputted to the shaft of the driving pulley 51. Receiving the rotation of the driving pulley 51, the timing belt 53 moves circumferentially. The driving pulley 51 is disposed on the left on the front side of the lower frame 25. The timing belt 53 wound around the driving pulley 51 is extended to the vicinity of the center along the front side of the lower frame 25, is bent substantially at the right angle by being wound on an intermediate pulley 54 disposed upstream from the guide shaft 29, and is extended to the back surface of the lower frame 25 along the guide shaft 29 to be wound around the driven pulley 52 disposed near the back surface, whereby the timing belt 53 is entrained in an L-shape. The driven pulley 52 is rotatably supported by a pulley holder 55 that is slidable in the axial direction of the guide shaft 29. The pulley holder 55 is pressed toward the back surface of the lower frame 25 by a helical torsion coil spring 56. Receiving this pressing force, an appropriate tension is given to the timing belt 53 wound around the driven pulley 52. The part of the timing belt 53 between the driven pulley 52 and the intermediate pulley 54, that is, the part along the guide shaft 29 is grasped by the belt grasping portion 48 of the carriage 28. Thereby, the timing belt 53 and the carriage 28 are coupled together. It is to be noted that as the timing belt 53, a non-endless belt having both ends thereof fixed to the carriage 28 may be used as well as an endless belt.

While in the present embodiment, the CIS 27 is mounted on the carriage 28 and moved parallel to the platen glass 20 by the belt driving mechanism 30, the moving means for the line sensor such as the CIS 27 is not limited thereto; for example, a structure may be adopted such that the carriage 28 is omitted, the guide shaft 29 directly supports the CIS 27 and the timing belt 53 of the belt driving mechanism 30 is directly coupled to the CIS 27.

As shown in FIG. 3, the original cover 4 has the ADF 3 that continuously conveys the original from an original tray 60 (original placement portion) by way of a predetermined original conveyance path 61 (conveyance path) to an original output tray 62 (original output portions). In the process of conveyance by the ADF 3, the original passes through the moving original reading area 23 on the top surface of the original table 2, and the image reading unit 24 that is on standby therebelow reads the image of the original.

On the top surface of the original cover 4, the original tray 60 and the original output tray 62 are provided one on the other with the original tray 60 below. The original tray 60 is formed integrally with the top surface of the original cover 4. The originals from which the ADF 3 performs image reading are placed on the original tray 60 with their fronts end in the paper feed direction being inserted in the ADF 3 in a condition where a plurality of sheets are piled up.

On the original tray 60, a pair of original guides 63 that is apart in the direction of the width of the image reading device 1 is provided so as to be slidable in the direction of the width of the device. The original guides 63 rise from the original tray 60 to restrict the position, in the direction of the width, of the originals placed on the original tray 60. The pair of original guides 63 is structured so that when one original guide 63 is slid, the other original guide 63 is slid in the opposite direction in synchronization therewith by a known interlock mechanism.

In the case of originals of a small width, when one original guide 63 is slid toward the center in the direction of the width of the device, the other original guide 63 is also slid toward the center in the direction of the width of the device in synchronization therewith. Thereby, the original width restricted by the pair of original guides 63 can be reduced with substantially the center in the direction of the width of the device as the reference. In the case of originals of a large width, when one original guide 63 is slid outward in the direction of the width of the device, the other original guide 63 is also slid outward in the direction of the width of the device in synchronization therewith, so that the original width restricted by the pair of original guides 63 can be increased.

The original output tray 62 is integrally formed on the pair of original guides 63 so as to be apart in the vertical direction from the original tray 60. The original outputted from the ADF 3 is held in a condition of being separated from the originals on the original tray 60 while its both sides are supported on the original output tray 62. An original whose length in the paper output direction is larger than the original output tray 62 is held on the original tray 60 with its end in the paper output direction hanging from the original output tray 62. Consequently, the front end, in the paper output direction, of the original on the original output tray 62 is situated on the rear end, in the paper feed direction, of the originals on the original tray 60. However, since the front end, in the paper feed direction, of the originals on the original tray 60 and the rear end, in the paper output direction, of the originals on the original output tray 62 are held so as to be placed one on the other by the original output tray 62, originals not read yet and originals already read are never mixed up with each other. By the original output tray 62 being short, the necessary space on the original cover 4 can be reduced to thereby reduce the size of the image reading device 1.

An extension tray 64 is provided on the end, of the original tray 60, on the side where the ADF 3 is not provided, that is, on the end on the back side of the device. By its device back side being pivotably supported, the extension tray 64 is pivotable between an extended position where it protrudes toward the back side of the original tray 60 and a turned-down position where it is turned down on the top surface of the original tray 60. By setting the extension tray 64 in the extended position, originals larger than the original tray 60 can be held by the original tray 60 and the extension tray 64. Thereby, originals of a size larger than the original tray 60 can be conveyed by the ADF 3 while placed on the original tray 60 and the extension tray 64, and the originals outputted from the ADF 3 can be held by the original output tray 62, the original tray 60 and the extension tray 64. When an original of a size not larger than the original tray 60 is read, by setting the extension tray 64 in the turned-down position, the area of the original cover 4 can be reduced, so that size reduction of the device is realized.

Figure 10:
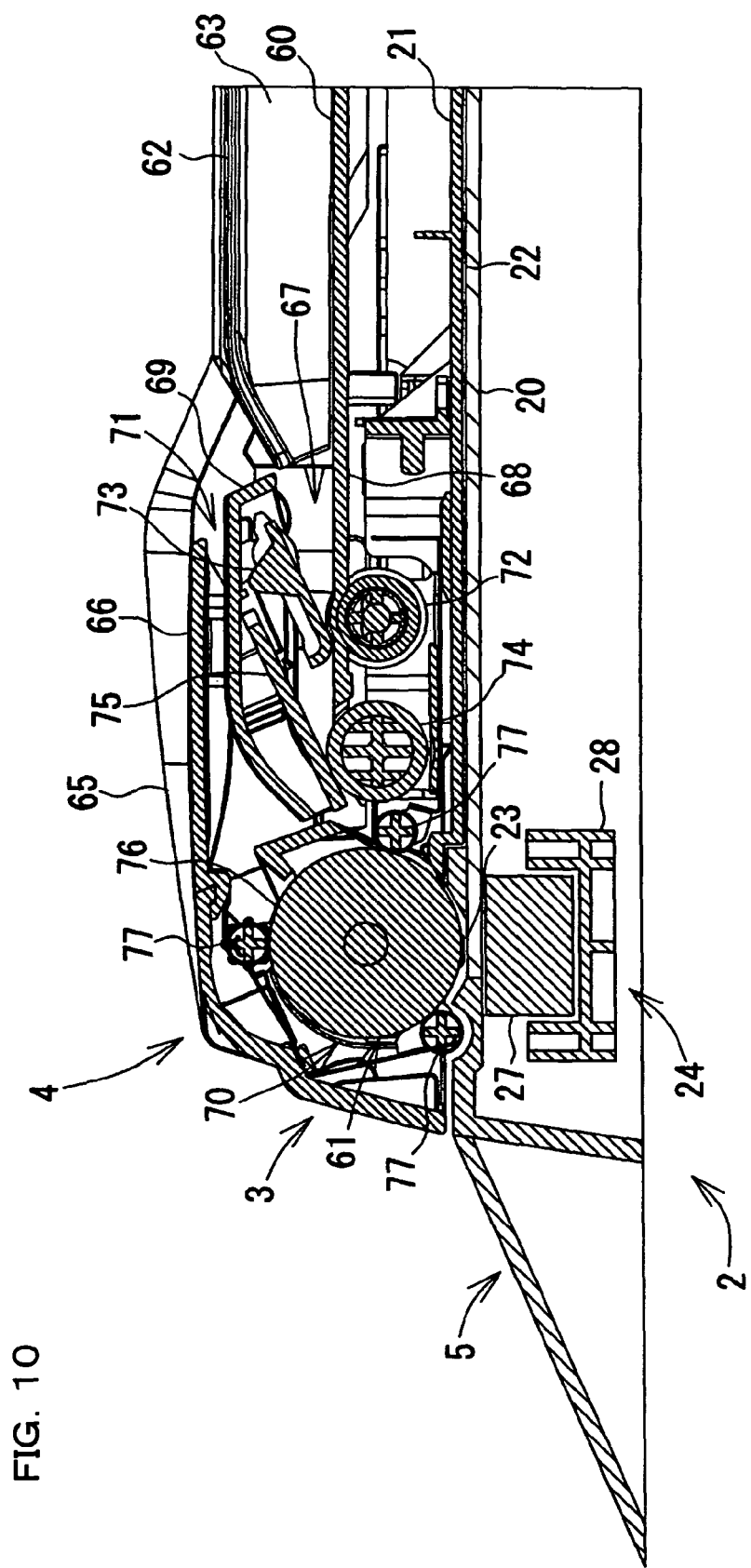
FIG. 10 is a longitudinal cross-sectional view showing the principal structure of an ADF.

FIG. 10 is a longitudinal cross-sectional view showing the internal structure of the ADF 3. As shown in FIG. 10, in the ADF 3, the original conveyance path 61 is formed substantially in a U shape when viewed laterally in a longitudinal cross section, so as to couple the original tray 60 and the original output tray 62 together. The original conveyance path 61 comprises an ADF body 65 formed integrally with the original cover 4 and an ADF cover 66 openable and closably provided on the ADF body 65. An admission chute 67 of the ADF 3 is formed so as to extend the original placement surface of the original tray 60. The admission chute 67 is vertically formed as a passage of a predetermined width with the following as guide surfaces: a guide plate 68 formed integrally with the ADF body 65; and a partitioning plate 69 disposed inside the ADF cover 66. The originals from which the ADF 3 performs image reading are placed on the original tray 60 with their front ends in the paper feed direction being inserted in the admission chute 67.

The original conveyance path 61 forms a so-called U-turn path from the admission chute 67 by way of a bent portion 70 to a paper output chute 71. The bent portion 70 and the paper output chute 71 are also continuously formed as a passage of a predetermined width by the ADF body 65, the ADF cover 66, the partitioning plate 69, and the like. The original set on the original tray 60 is fed to the bent portion 70 by being guided by the admission chute 67, and is outputted from the paper output chute 71 to the original output tray 62, whereby the original is conveyed from the original tray 60 to the original output tray 62 so as to be reversed.

An admission roller 72 and an admission nip member 73 pressed thereagainst, a separation roller 74 and a separation nip member 75 pressed thereagainst, and an original conveyance roller 76 and pinch rollers 77 pressed thereagainst are disposed on the original conveyance path 61. While these components constitute the conveying means for conveying the original, the structures of the rollers and the nip members are merely an example, and it is to be noted that the number of rollers and the disposition may be changed or the conveying means may be changed to different known conveying means such as using pinch rollers instead of the nip members.

The admission roller 72 is rotatably provided substantially in the center of the admission chute 67 so that part of its roller surface is exposed from the top surface of the guide plate 68. Likewise, the separation roller 74 is rotatably provided in a position apart from the admission roller 72 in the paper feed direction so that part of its roller surface is exposed from the top surface of the guide plate 68. The admission roller 72 and the separation roller 74 are rotated by receiving the driving force from the motor. The admission roller 72 and the separation roller 74 which have the same diameter are rotated at the same circumferential velocity. In the driving transmission to the admission roller 72, a one-rotation clutch is interposed, and the admission roller 72 can run idle by an amount corresponding to one rotation.

The admission nip member 73 is provided in a position opposed to the admission roller 72 of the partitioning plate 69 so as to be swingable in directions in which it comes into contact with and separates from the admission roller 72. The admission nip member 73 is in the form of a pad whose width is slightly smaller than the roller width, in the axial direction, of the admission roller 72. The admission nip member 73 is rotatably supported by the partitioning plate 69 with its both ends in the upstream side in the paper feed direction as the rotation axis, whereby the end on the downstream side in the paper feed direction moves backward and forward so that it can come into contact with the roller surface of the admission roller 72. The admission nip member 73 is resiliently pushed downward by a spring member, and is pressed against the admission roller 72 at all times in a condition of not nipping the original. Although a roller may be used instead of the pad-form admission nip member 73, by using a pad-form abutting member, a simple and space-saving abutting member can be realized, and the adjustment of the resilient pushing force applied to the abutting member is easy.

The separation nip member 75 is provided in a position opposed to the separation roller 74 of the partitioning plate 69 so as to be swingable in a direction in which it comes into contact with and separates from the separation roller 74. The separation nip member 75 is in the form of a pad whose width is slightly smaller than the roller width, in the axial direction, of the separation roller 74. The end, on the downstream side in the paper feed direction, of the separation nip member 75 moves backward and forward so that it can come into contact with the roller surface of the separation roller 74 with its upstream side in the paper feed direction as the rotation axis. The separation nip member 75 is resiliently pushed downward by a spring member, and is pressed against the roller surface of the separation roller 74 at all times in a condition of not nipping the original. Although a roller may be made to abut on the separation roller 74 instead of the pad-form separation nip member 75, by using a pad-form abutting member, a simple and space-saving abutting member can be realized, and the adjustment of the resilient pushing force applied to the abutting member is easy.

The original conveyance roller 76 is disposed at the bent portion 70, formed substantially in a U shape when viewed laterally, of the original conveyance path 61. The original conveyance roller 76 has an outer diameter such that its roller surface constitutes part of the bent portion 70. Like the admission roller 72 and the separation roller 74, the original conveyance roller 76 is rotated by receiving the driving force from the motor.

The pinch rollers 77 are provided in three positions around the original conveyance roller 76. The pinch rollers 77 are each rotatably supported by the ADF body 65 or the ADF cover 66 by its shaft being resiliently pushed by a spring member, and are pressed against the roller surface of the original conveyance roller 76. When the original conveyance roller 76 rotates, the pinch rollers 77 also rotate in synchronization therewith. The pinch rollers 77 press the original against the original conveyance roller 76, thereby transmitting the rotating force of the original conveyance roller 76 to the original.

The paper output chute 71 is formed on the downstream side in the paper feed direction of the original conveyance roller 76. The paper output chute 71 is formed between the ADF cover 66 and the partitioning plate 69 so as to be continuous with the bent portion 70 of the original conveyance path 61 constituted by the inner surface of the ADF cover 66 and the original conveyance roller 76. The original fed from the original tray 60 to the original conveyance path 61 passes through the admission chute 67, the bent portion 70 and the paper output chute 71, and is outputted onto the original output trays 62.

The ADF cover 66 is provided so as to be upwardly rotatable with its original tray 60 side from the admission roller 72 as the rotation axis. By opening the ADF cover 66, the guide plate 68 and the partitioning plate 69 are largely separated from each other, so that the admission chute 67 and the bent portion 70 are opened and the admission roller 72 and the separation roller 74, and the admission nip member 73 and the separation nip member 75 are largely separated from each other. By opening the ADF cover 66, paper jams occurring on the original conveyance path 61 can be cleared, and maintenance of the inside of the ADF 3 can be performed.

Figure 11:
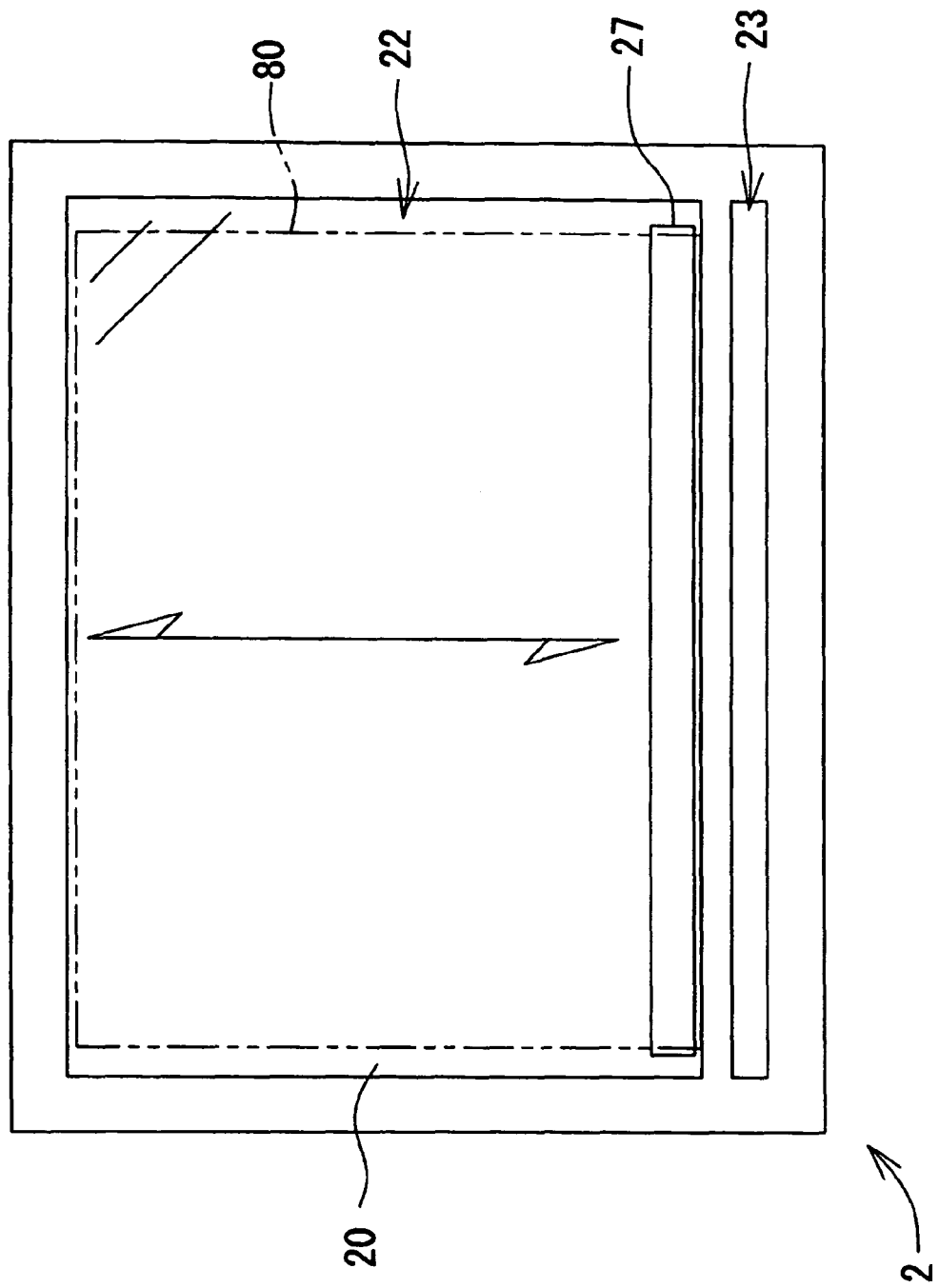
FIG. 11 is a plan view for explaining the image reading operation in a stationary original reading area.
Figure 12:
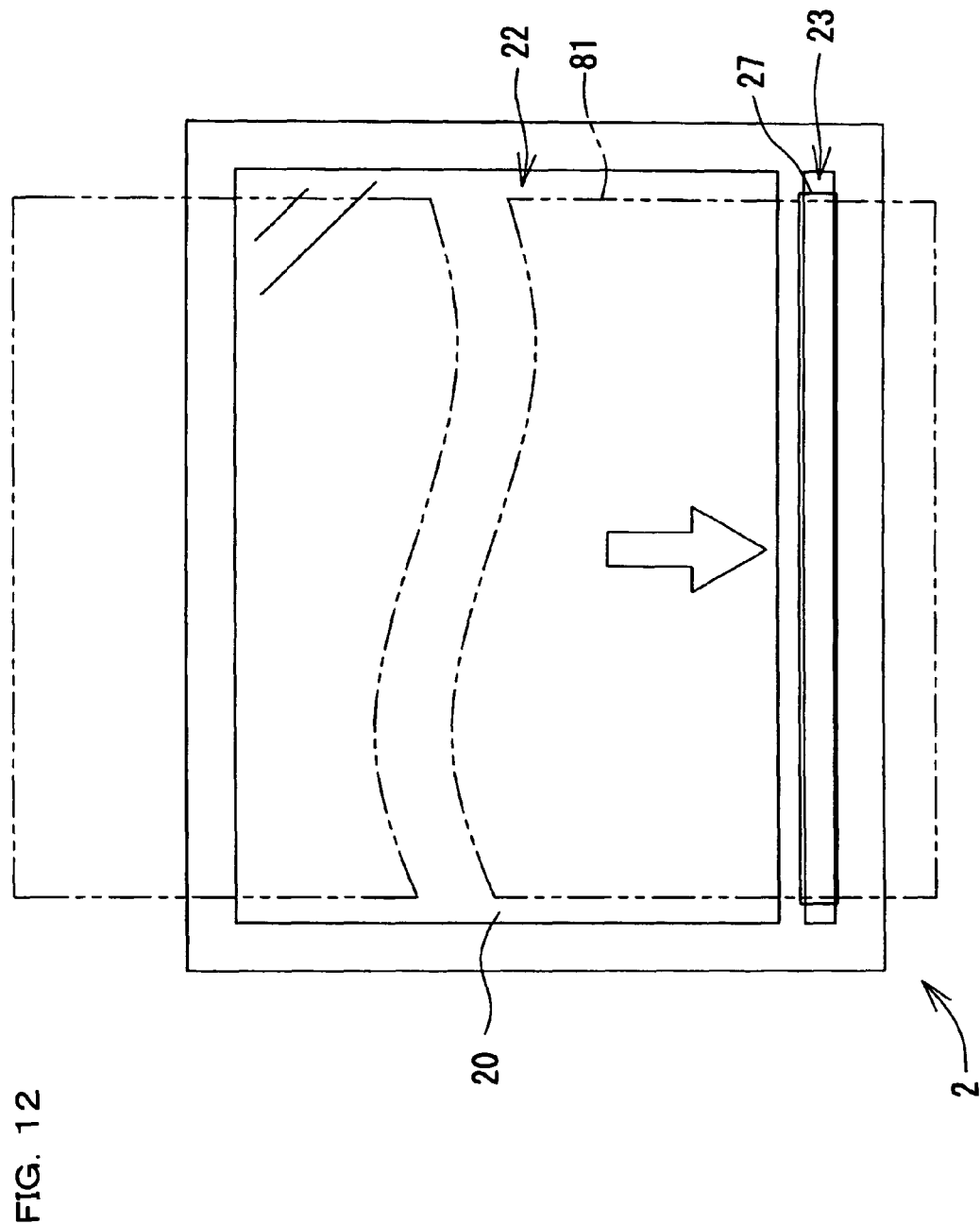
FIG. 12 is a plan view for explaining the image reading operation in a moving original reading area.

The image reading operation by the image reading device 1 will be described with reference to FIGS. 11 and 12. FIGS. 11 and 12 are plan views showing the top surface of the original table 2. In the figures, the original cover 4 and the operation panel 5 are omitted. As shown in the figures, the stationary original reading area 22 and the moving original reading area 23 are formed on the original table 2. While the side where the moving original reading area 23 is formed is the front side of the device, the position of the moving original reading area 23 is changed as appropriate according to whether the ADF 3 is provided on the device front side or the device back side of the original cover 4.

As shown in FIG. 11, when the image reading device 1 is used as an FBS, the original is placed on the stationary original reading area 22. The maximum original size that can be placed on the stationary original reading area 22 is A4 size. The area 80 indicated by the chain double-dashed line shown in the figure represents an area equal to A4 size. As shown in the figure, an A4-size original is placed with the direction of the length thereof as the direction of the length of the stationary original reading area 22, that is, the direction of the width of the device.

The CIS 27 is incorporated in the original table 2. As shown in the figures, the CIS 27 is a line sensor that is elongated in the direction of the length of the stationary original reading area 22 and whose reading line is the direction of the length of its elongated shape. The reading line of the CIS 27 is substantially the same in width as the direction of the length of the stationary original reading area 22, and corresponds to the length in the direction of the length of A4-size originals. When image reading is started, the CIS 27 is moved to one end in the direction of the width of the stationary original reading area 22, for example, to the side of the moving original reading area 23 by the belt driving mechanism 30 described previously. Then, the CIS 27 is moved to the other end of the stationary original reading area 22, for example, to the back side of the device while emitting light from the light source and receiving the light reflected from the original. That is, the CIS 27 is moved in the direction of the width of the stationary original reading area 22. During this movement, the reflected light successively received by the CIS 27 is converted into an electric signal and outputted, and with the direction of the length of the stationary original reading area 22 as the reading line, image reading from the original is performed. That is, the CIS 27 performs image reading from the original with the direction of the length of the stationary original reading area 22 as the main scanning direction and the direction of the width thereof as the sub scanning direction. Further, in other words, the image reading from A4-size originals is performed with the direction of the length thereof as the main scanning direction and the direction of the width thereof as the sub scanning direction. Thereby, the distance by which the CIS 27 is moved is short compared with when image reading is performed by a line sensor with the direction of the width of the stationary original reading area 22 as the main scanning direction and the direction of the length thereof as the sub scanning direction, so that the movement time of the CIS 27 is reduced. In particular, since the return time to return the CIS 27 to the standby position after original reading is reduced, the time required for image reading is reduced.

FIG. 12 depicts the movement of the original with respect to the original table 2 when the ADF 3 is used. When the ADF 3 is used, as shown in FIG. 12, the CIS 27 is moved and stopped below the moving original reading area 23. The original to be read is placed on the original tray 60 of the ADF 3. The width of the original conveyance path 61 of the ADF 3 corresponds to the direction of the length of the moving original reading area 23. The length in the direction of the length of the moving original reading area 23 is equal to the length in the direction of the length of the stationary original reading area 22, and corresponds to the length in the direction of the length of A4-size originals. The ADF 3 is capable of conveying originals of widths of up to the width of the original conveyance path 61. That is, it is capable of conveying originals whose length in the direction of the width is the length in the direction of the length of A4-size originals. The originals of the standard size having such a width are of A3 size. Thus, the ADF 3 is capable of conveying A3-size originals with the direction of the length of the original as the conveyance direction.

The top surface of the original table 2 is slightly larger than A4 size, and approximately the same as the two-dimensional area of the original cover 4. Therefore, although when an A3-size original is placed on the original tray 60 formed on the top surface of the original cover 4, part of the A3-size original lies outside the original cover 4, it can be held on the original cover 4 by setting the extension tray 64 in the extended position. The A3-size original placed on the original tray 60 and the extension tray 64 is fed to the original conveyance path 61 and reaches the moving original reading area 23. By being further conveyed, the original passes through the moving original reading area 23. At that time, the CIS 27 reads the image of the original being conveyed.

The area 81 indicated by the chain double-dashed line in FIG. 12 represents an A3-size original. As shown in the figure, the direction in which the A3-size original passes through the moving original reading area 23 is a direction orthogonal to the direction of the length of the moving original reading area 23. The direction of the length of the moving original reading area 23 and the direction of the reading line of the CIS 27 are the same. That is, the direction of the length of the moving original reading area 23 is the main scanning direction of the CIS 27, and the original conveyance direction is the sub scanning direction of the CIS 27. Therefore, image reading from A3-size originals conveyed by the ADF 3 is performed with the direction of the width thereof as the main scanning direction and the direction of the length thereof as the sub scanning direction. Thereby, image reading from originals of widths that lie within the length of the moving original reading area 23, that is, originals of up to A3 size can be performed.

As described above, according to the image reading device 1, since the stationary original reading area 22 that is rectangular when viewed two-dimensionally and the moving original reading area 23 disposed along the direction of the length of the stationary original reading area 22 are formed on the top surface of the original table 2 and the CIS 27 provided in the original table 2 performs image reading from the original placed on the stationary original reading area 22 with the direction of the length of the stationary original reading area 22 as the main scanning direction and the direction of the width thereof as the sub scanning direction, the movement width of the CIS 27 with respect to the stationary original reading area 22 is reduced. Moreover, since in the moving original reading area 23, the original is conveyed by the ADF 3 in the direction orthogonal to the direction of the length of the moving original reading area 23 and image reading from the conveyed original is performed with the direction of the length of the moving original reading area 23 as the main scanning direction of the CIS 27 and the conveyance direction as the sub scanning direction, image reading from originals of widths that lie within the length of the moving original reading area 23 is performed. Thereby, image reading from originals of large sizes that cannot be placed on the stationary original reading area 22 corresponding to A4 size, for example, A3 size can be performed.

While a case where the CIS 27 is used as the line sensor is shown in the present embodiment, the line sensor is not limited to the CIS; for example, a so-called image reading unit of a reduction optical system that reduces the image of the original by a reflecting mirror, a lens and the like and focuses it on a CCD (charge coupled device) by using the CCD as the line sensor may be used.

Moreover, while in the present embodiment, the ADF 3 of a U-turn path is shown in which the original tray 60 and the original output tray 63 are placed one on the other on the original cover 4 with the original tray 60 below and the original is conveyed from below to above so as to be reversed, it is to be noted that similar effects are obtained when a change is made to a U-turn path in which the positional relation between the original tray 60 and the original output tray 63 is vertically reversed so that the original is conveyed from above to below.

Figure 13:
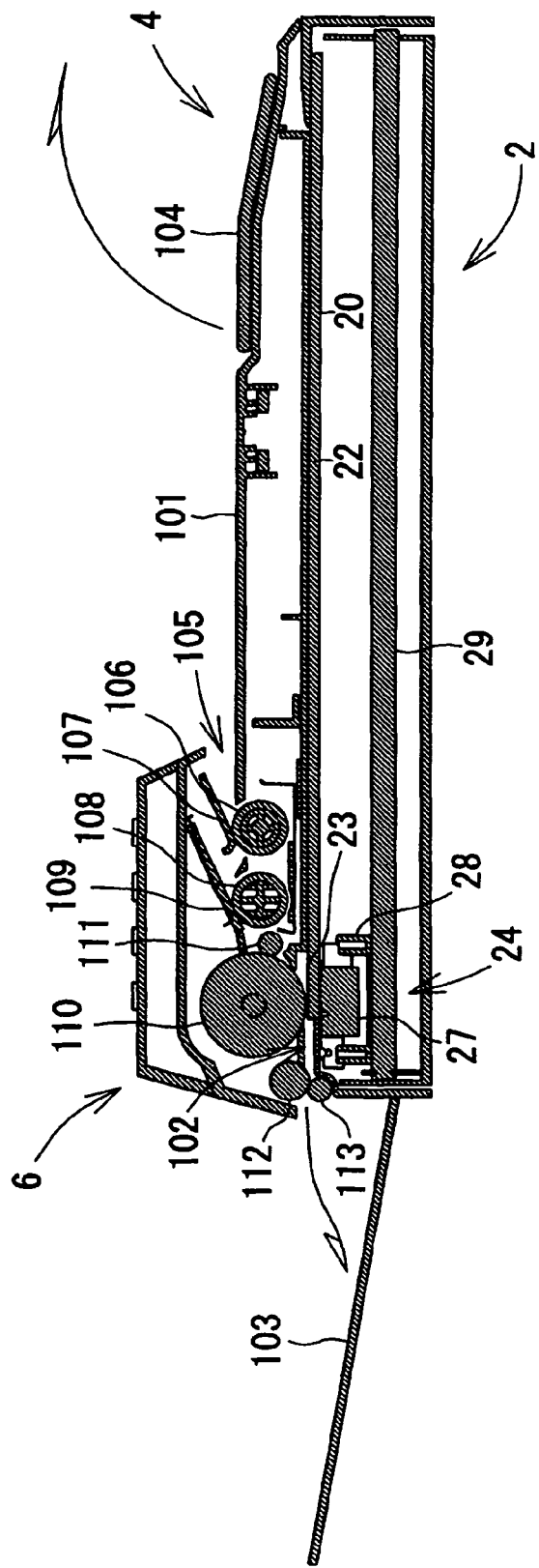
FIG. 13 is a longitudinal cross-sectional view showing the principal structure of an ADF.

Instead of the ADF 3 of the U-turn path in which the original is conveyed so as to be reversed like in the present embodiment, an ADF of a straight path may be used. Specifically, as shown in FIG. 13, an ADF 6 of a straight path is disposed on the original cover 4. On the original table 2, like in the above-described embodiment, the platen glass 20 is exposed from the top surface thereof, and the stationary original reading area 22 and the moving original reading area 23 are formed. Moreover, the image reading unit 24 is incorporated in the original table 2.

As shown in FIG. 13, the original cover 4 has an ADF 6 that continuously conveys the original from an original tray 101 (original placement portion) by way of a predetermined original conveyance path 102 (conveyance path) to an original output tray 103 (original output portion). In the process of conveyance by the ADF 6, the original passes through the moving original reading area 23 of the platen glass 20, and the image reading unit 24 that is on standby therebelow reads the image of the original.

The original tray 101 is formed integrally with the top surface of the original cover 4. The originals from which the ADF 6 performs image reading are placed on the original tray 101 with their front ends in the paper feed direction being inserted in the ADF 6 in a condition where a plurality of sheets are piled up. While the original tray 101 has original guides like in the above-described embodiment, they are not shown in the figure. An extension tray 104 is provided on the end, of the original tray 101, on the side where the ADF 6 is not provided. The extension tray 104 is similar to the extension tray 64, and by the end of the original tray 101 being pivotably supported, the extension tray 104 is pivotable between an extended position where it protrudes from the original tray 101 and a turned-down position where it is turned down on the top surface of the original tray 101.

The original output tray 103 is disposed in a position opposed to the original tray 101 with the moving original reading area 23 in between so as to protrude slightly upward from the horizontal from a side surface of the original table 2. The original output tray 103 holds the originals outputted from the ADF 6. The original output tray 103 is capable of holding originals of up to the maximum size that can be conveyed by the ADF 6, specifically, originals of up to A3 size, the size of the original output tray 103 can be reduced by making the original output tray 103 approximately as large as originals of A4 size and providing an extension tray similar to the extension tray 104. The ADF 6 may be disposed either on the front side or the back side of the device, and in correspondence therewith, the original output tray 103 may also be disposed either on the front side or the back side of the device.

In the ADF 6, the original conveyance path 102 is formed so as to couple the original tray 101 and the original output tray 103 together. The original conveyance path 102 is a straight path leading from an admission chute 105 by way of the moving original reading area 23 to the original output tray 103. The original is straightly conveyed from the original tray 101 to the original output tray 103 along the original conveyance path 102.

An admission roller 106 and an admission nip member 107 pressed thereagainst, a separation roller 108 and a separation nip member 109 pressed thereagainst, an original conveyance roller 110 and pinch rollers 111 pressed thereagainst, and a paper output roller 112 and a pinch roller 113 pressed thereagainst are disposed on the original conveyance path 102. Since these components are similar to those of the above-described embodiment, detailed descriptions thereof are omitted. While these components constitute the conveying means for conveying the original, the structures of the rollers and the nip members are merely an example, and it is to be noted that the number of rollers and the disposition may be changed or the conveying means may be changed to different known conveying means such as using pinch rollers instead of the nip members.

When image reading from originals is performed by such an ADF 6, like in the above-described embodiment, the CIS 27 is moved and stopped below the moving original reading area 23 (see FIG. 12). The original to be read is placed on the original tray 101 of the ADF 6. The width of the original conveyance path 102 of the ADF 6 corresponds to the direction of the length of the moving original reading area 23, and originals whose length in the direction of the width is the length in the direction of the length of originals of A4 size, specifically, originals of A3 size can be conveyed with the direction of the length of the originals as the conveyance direction.

The direction in which A3-size originals conveyed by the ADF 6 pass through the moving original reading area 23 is a direction orthogonal to the direction of the length of the moving original reading area 23. That is, the direction of the length of the moving original reading area 23 is the main scanning direction of the CIS 27, and the original conveyance direction is the sub scanning direction of the CIS 27. Therefore, image reading from A3-size originals is performed with the direction of the width thereof as the main scanning direction and the direction of the length thereof as the sub scanning direction. Thereby, image reading from originals of widths that lie within the length of the moving original reading area 23, that is, originals of up to A3 size can be performed. As described above, effects similar to those of the above-described embodiment are obtained when the ADF 6 of the straight path is used instead of the ADF 3.

Second Embodiment

Hereinafter, a second embodiment will be described. While in the above-described first embodiment, the original cover 4 having the ADF 3 is openably and closably provided on the original table 2 so as to cover both the stationary original reading area 22 and the moving original reading area 23, in the second embodiment, an original cover 10 is openably and closably provided on the original table 2 so as to cover only the stationary original reading area 22, and a principal part such as the conveying means of an ADF 9 is provided independently of the original cover 10.

Figure 14:
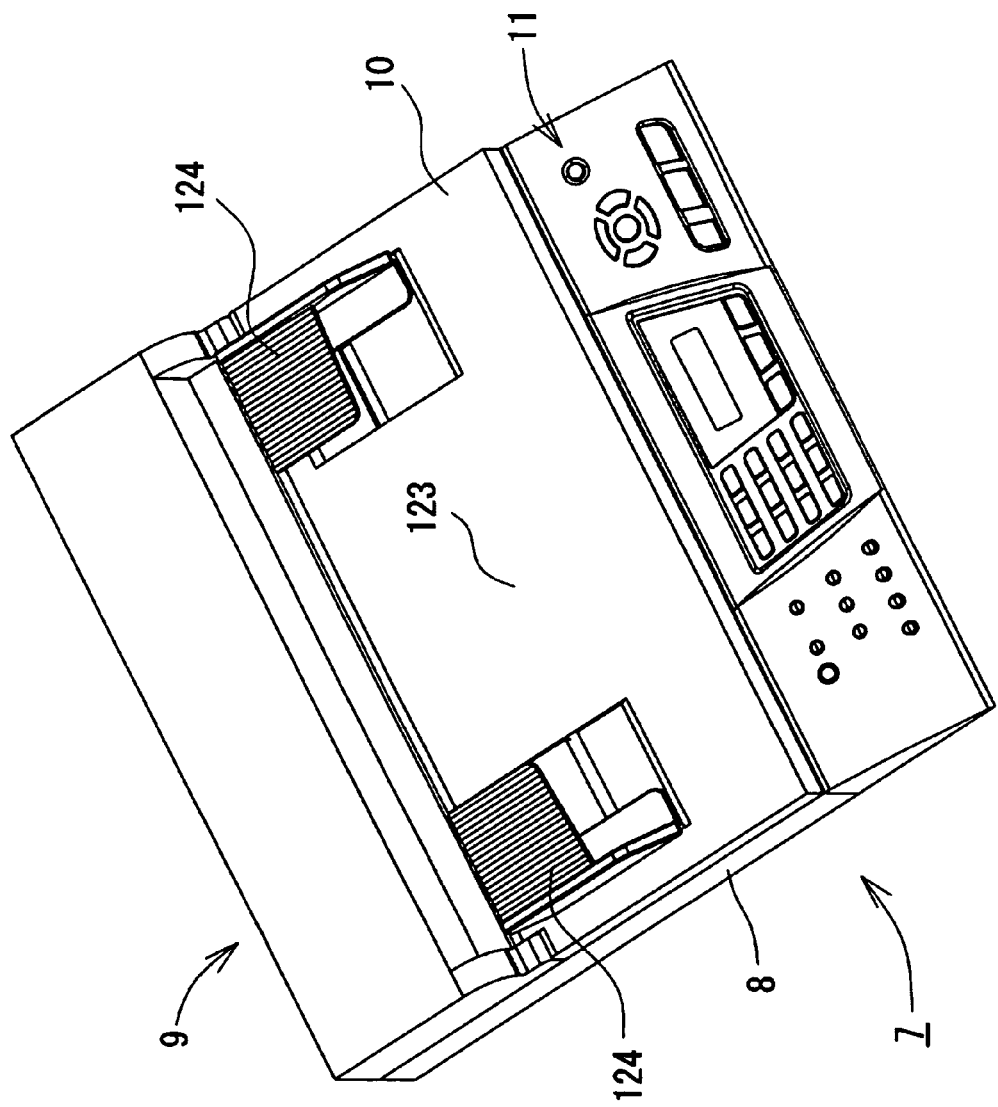
FIG. 14 is a perspective view showing the external structure of an image reading device according to a second embodiment.

FIG. 14 is a perspective view showing the external structure of an image reading device 7 according to the second embodiment. In the image reading device 7, the ADF 9 is provided above an original table 8 functioning as an FSB, and the original cover 10 (cover member) constituting part of the ADF 9 is openably and closably attached to the original table 8.

An operation panel 11 is provided on the front side of the image reading device 7. The operation panel 11 is similar to the operation panel 5, and has various operation keys and a liquid crystal display. The image reading device 7 operates not only on instructions inputted to the operation panel 11 but also on instructions transmitted, when the image reading device 7 is connected to a computer, from the computer through the scanner driver.

Figure 15:
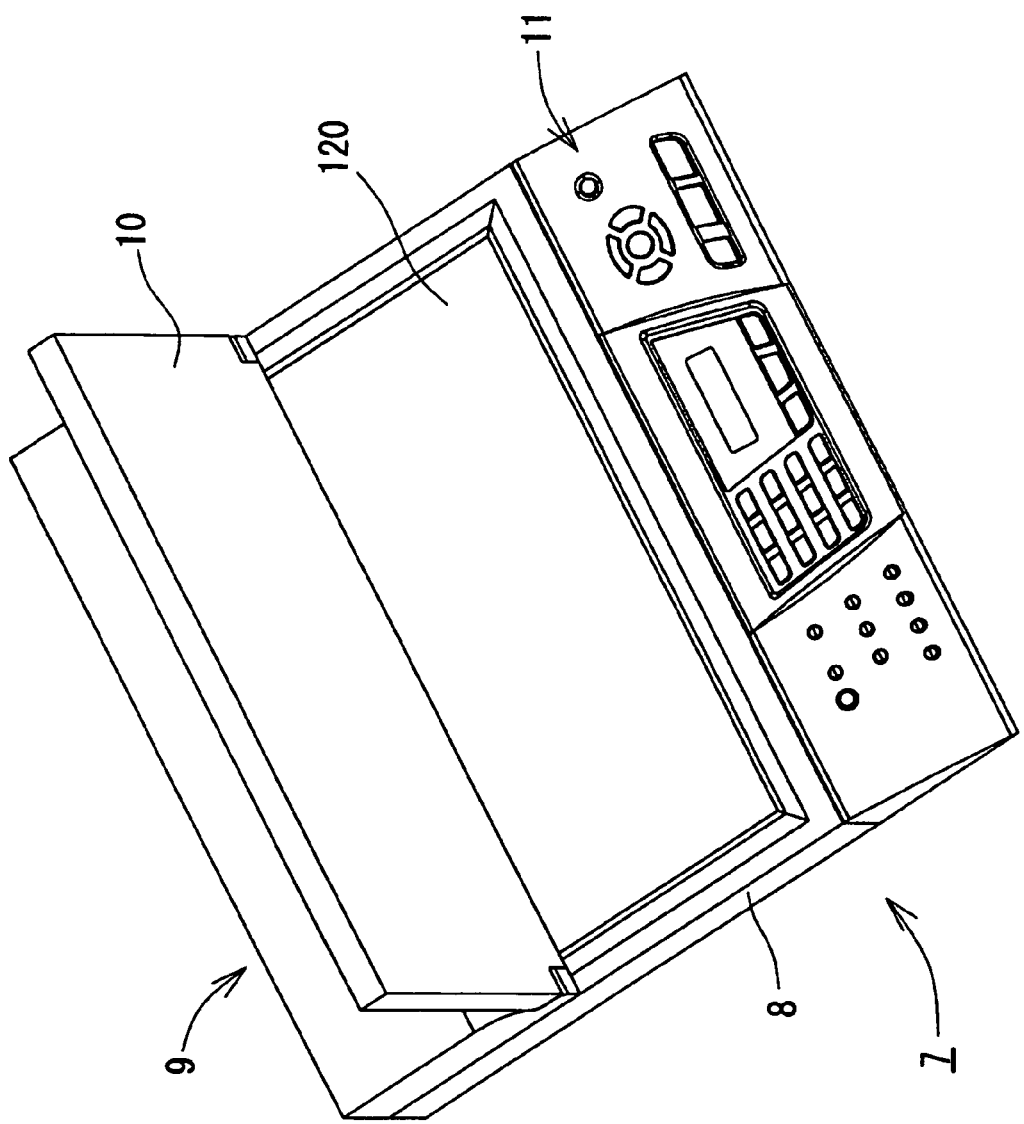
FIG. 15 is a perspective view showing the image reading device in a condition where an original cover is opened with respect to an original table.

FIG. 15 shows the image reading device 7 in a condition where the original cover 10 is opened with respect to the original table 8. As shown in the figure, a platen glass 120 (transparent member) is disposed on the top surface of the original table 8. The area where the platen glass 120 is exposed from the top surface of the original table 8 is a stationary original reading area 121. The stationary original reading area 121 is an area where the original is placed and read when the image reading device 7 is used as a flatbed scanner.

Figure 16:
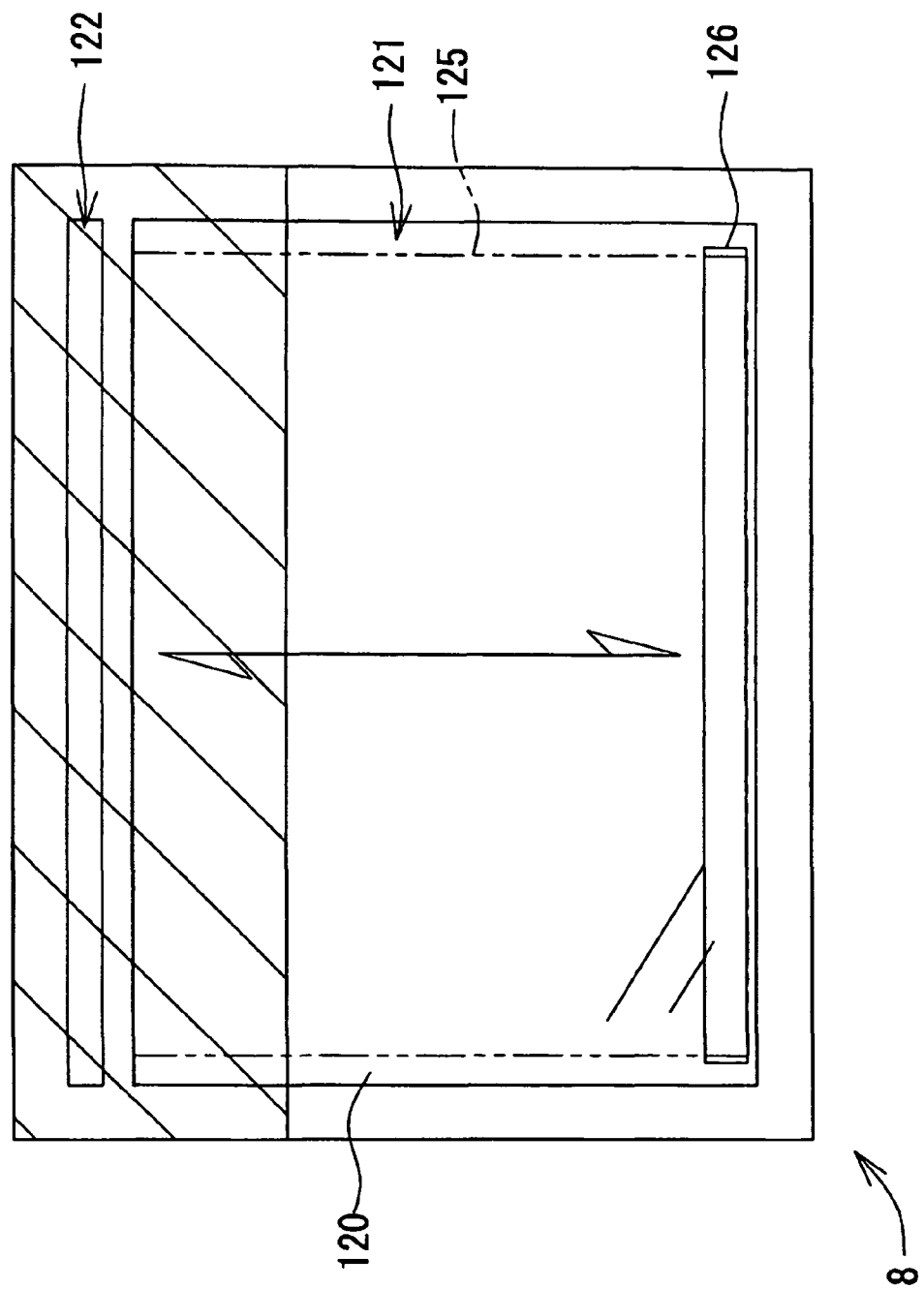
FIG. 16 is a plan view for explaining the image reading operation in a stationary original reading area.

FIG. 16 is a plan view of the original table 8 where the original cover 10 and the operation panel 11 are omitted. As shown in the figure, a moving original reading area 122 is provided on the device back side of the stationary original reading area 121 and immediately below the ADF 9. The moving original reading area 122 is an area where the original passes when image reading is performed by using the ADF 9 of the image reading device 7. The hatched area shown in the figure is the area not exposed even when the original cover 10 is opened. That is, the original cover 10 covers only part of the stationary original reading area 121, and is not opened or closed with respect to the moving original reading area 122. Although not shown, a pressing member comprising a sponge, a white board and the like is disposed on the lower surface of the original cover 10 in order to press the original placed on the stationary original reading area 121.

The stationary original reading area 121 is rectangular when viewed two-dimensionally, and occupies most of the top surface of the original table 8. The direction of the length of the stationary original reading area 121 is the direction of the width of the device. The maximum size that can be placed on the stationary original reading area 121 is A4 size. That is, when used as an FBS, the image reading device 7 can read originals of up to A4 size. A4-size originals are placed on the platen glass 120 with reference to the front side of the device so that the direction of the length thereof coincides with the direction of the length of the stationary original reading area 121, that is, with the direction of the length of the originals as the direction of the width of the device.

The moving original reading area 122 is formed on the device back side of the stationary original reading area 121. The moving original reading area 122 is an area elongated in the direction of the length of the stationary original reading area 121. When image reading is performed by using the ADF 9 of the image reading device 7, the original is conveyed so as to pass through the moving original reading area 122.

An image reading unit is incorporated in the original table 8. In the image reading by the FBS, a CIS 126 constituting the image reading unit is reciprocated along the platen glass 120 to thereby perform image reading from the original placed on the stationary original reading area 121. When the ADF 9 is used, the CIS 126 moves to a position where the original passing through the moving original reading area 122 can be read, and stops. Since such an image reading unit is similar to the image reading unit 24 described in the first embodiment, a detailed description thereof is omitted.

As shown in FIG. 14, the ADF 9 continuously conveys the original from an original tray 123 (original placement portion) by way of a predetermined original conveyance path to an original output tray 124 (original output portions). In the process of conveyance by the ADF 9, the original passes through the moving original reading area 122 on the top surface of the original table 8, and the CIS 126 that is on standby therebelow reads the image of the original. The original cover 10 has, on its top surface, part of the ADF 9, that is, the original tray 123 and the original output tray 124. In other words, the original conveyance path, the conveying means and the like of the ADF 9 are formed independently of the original cover 10. Therefore, although the original tray 123 and the original output tray 124 rotate together with the original cover 10 as the original cover 10 is opened and closed, the original conveyance path, the conveying means and the like of the ADF 9 are stationary irrespective of the opening and closing of the original cover 10. Since the internal structure of the ADF 9 is similar to that of the ADF 3 described in the first embodiment, a detailed description thereof is omitted. Although not shown, an extension tray similar to the extension tray 104 may be provided on the original tray 123.

When the image reading device 7 is used as an FBS, as shown in FIG. 15, the stationary original reading area 121 is exposed by opening the original cover 10. Then, the original is placed on the stationary original reading area 121. The stationary original reading area 121 is formed with the maximum placeable size as A4 size, and the area 125 indicated by the chain double-dashed line shown in FIG. 16 represents an area equal to A4 size. Although the area, on the device back side; of the stationary original reading area 121 (the hatched area of FIG. 16) is not exposed, an A4-size original can be placed on the stationary original reading area 121 by slipping the original from the exposed device front side.

The CIS 126 of the image reading unit is incorporated in the original table 8. As shown in the figures the CIS 126 is a line sensor that is elongated in the direction of the length of the stationary original reading area 121 and whose reading line is the direction of the length of its elongated shape. The reading line of the CIS 126 is substantially the same in width as the direction of the length of the stationary original reading area 121, and corresponds to the length in the direction of the length of A4-size originals. When image reading is started, the CIS 126 is moved in the direction of the width from the front side of the stationary original reading area 121 by a belt driving mechanism. During this movement, the CIS 126 emits light from the light source, receives the light reflected from the original, converts the received reflected light into an electric signal, and outputs them. Thereby, image reading from the original is performed with the direction of the length of the CIS 126 as the reading line. That is, the CIS 126 performs image reading from the original with the direction of the length of the stationary original reading area 121 as the main scanning direction and the direction of the width thereof as the sub scanning direction. Further, in other words, the image reading from A4-size originals is performed with the direction of the length thereof as the main scanning direction and the direction of the width thereof as the sub scanning direction. Thereby, the distance by which the CIS 126 is moved is short compared with when image reading is performed by a line sensor with the direction of the width of the stationary original reading area 121 as the main scanning direction and the direction of the length thereof as the sub scanning direction, so that the movement time of the CIS 126 is reduced.

Figure 17:
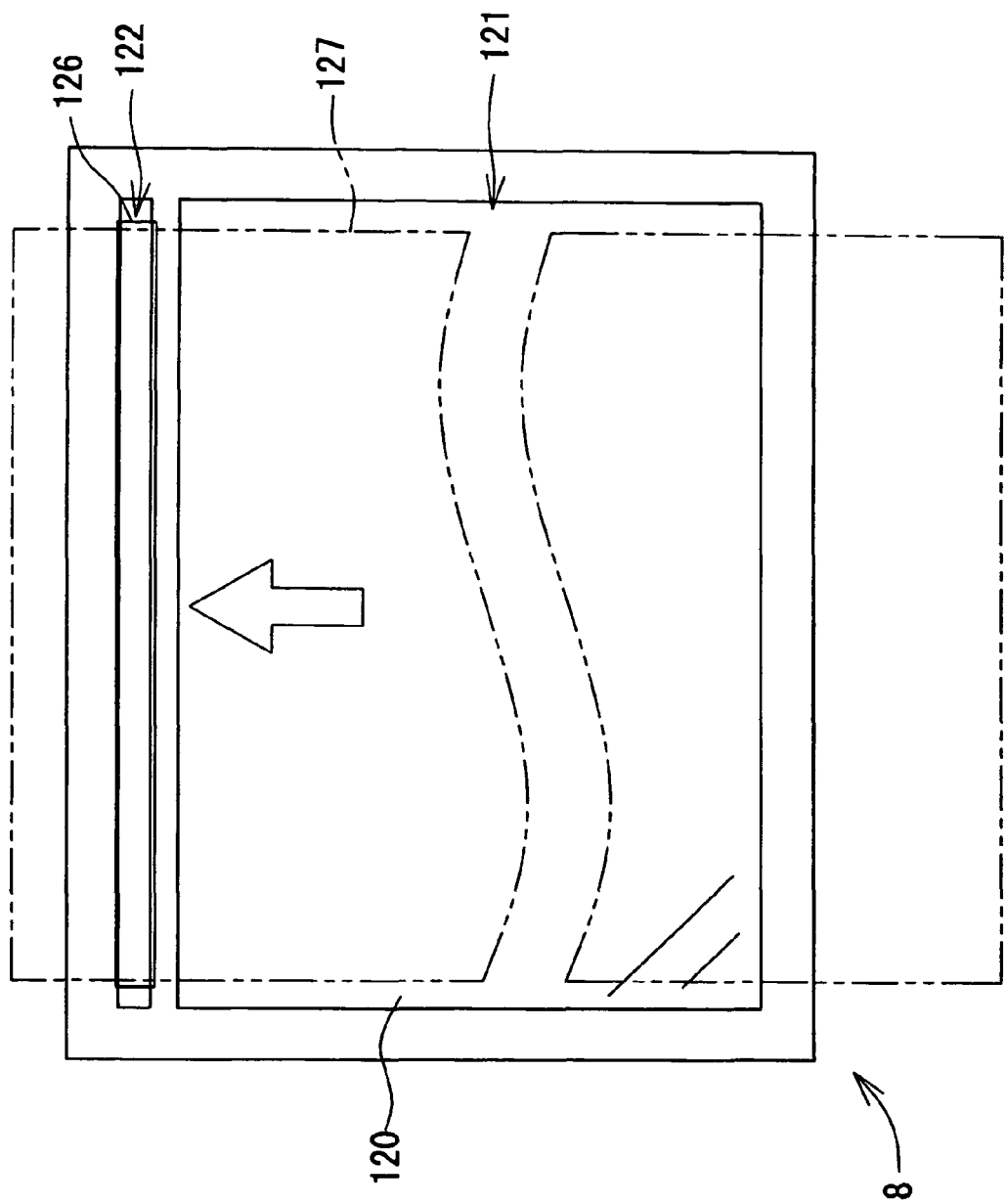
FIG. 17 is a plan view for explaining the image reading operation in a moving original reading area.

FIG. 17 depicts the movement of the original with respect to the original table 8 when the ADF 9 is used. When the ADF 9 is used, as shown in FIG. 14, the original cover 10 is closed with respect to the original table 8. Then, as shown in FIG. 17, the CIS 126 is moved and stopped below the moving original reading area 122. The original to be read is placed on the original tray 123 of the ADF 9. The width of the original conveyance path of the ADF 9 corresponds to the direction of the length of the moving original reading area 122. The length in the direction of the length of the moving original reading area 122 is equal to the length in the direction of the length of the stationary original reading area 121, and corresponds to the length in the direction of the length of A4-size originals.

The ADF 9 is capable of conveying originals of widths of up to the width of the original conveyance path. That is, it is capable of conveying originals whose length in the direction of the width is the length in the direction of the length of A4-size originals. The originals of the standard size having such a width are of A3 size. Thus, the ADF 9 is capable of conveying A3-size originals with the direction of the length of the originals as the conveyance direction.

The A3-size original placed on the original tray 123 is fed to the original conveyance path and reaches the moving original reading area 122. By being further conveyed, the original passes through the moving original reading area 122. At that time, the CIS 126 reads the image of the original being conveyed.

The area 127 indicated by the chain double-dashed line in FIG. 17 represents an A3-size original. As shown in the figure, the direction in which the A3-size original passes through the moving original reading area 122 is a direction orthogonal to the direction of the length of the moving original reading area 122. The direction of the length of the moving original reading area 122 and the direction of the reading line of the CIS 126 are the same. That is, the direction of the length of the moving original reading area 122 is the main scanning direction of the CIS 126, and the original conveyance direction is the sub scanning direction of the CIS 126. Therefore, image reading from A3-size originals conveyed by the ADF 9 is performed with the direction of the width thereof as the main scanning direction and the direction of the length thereof as the sub scanning direction. Thereby, image reading from originals of widths that lie within the length of the moving original reading area 122, that is, originals of up to A3 size can be performed.

As described above, similar workings and effects to those of the above-described first embodiment are obtained by the image reading device 7. Moreover, by a structure like the present embodiment that the original cover 10 covers only the stationary original reading area 121, only the original tray 123 and the original output tray 124 constituting part of the ADF 9 rotate as the original cover 10 is opened and closed, the remaining components of the ADF 9 such as the original conveyance path and the conveying means provided above the moving original reading area 122 are stationary above the original table 8 independently of the original cover 10, the weight of the original cover 10 is reduced, so that the opening and closing of the original cover 10 is facilitated. In addition, since the shock and vibrations incident to the opening and closing of the original cover 10 are not directly transmitted to the driving portion such as the conveying means of the ADF 9, the failure of the ADF 9 can be reduced.

In the present embodiment, an image reading unit of a reduction optical system using a CCD may also be used instead of the CIS 126. Moreover, it is to be noted that in the ADF 9, a change may be made to a U-turn path in which the positional relation between the original tray 123 and the original output tray 124 is vertically reversed so that the original is conveyed from above to below so as to be reversed or a straight path may be used instead of the U-turn path.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An image reading device comprising:
   an original table having:
      a stationary original reading area that is rectangular when viewed two-dimensionally and where a transparent member is exposed from a top surface thereof, wherein a length of the stationary original reading area is longer than a width of the stationary original reading area; and
      an area for reading an image of a moved original where the transparent member is exposed along a direction of the length of the stationary original reading area;
   a line sensor provided inside the original table, and configured to move a reading line in a direction of the width of the stationary original reading area and configured to move the reading line to the area for reading an image of a moved original with the direction of the length of the stationary original reading area as the reading line;
   a cover member openably and closably provided on the original table so as to cover at least the stationary original reading area;
   an original conveying mechanism having a conveyance path leading from an original placement portion where an original to be read is placed by way of the area for reading an image of a moved original in a direction orthogonal to a direction of a length of the area for reading an image of a moved original to an original output portion where the original is outputted; and
   an operational panel configured to receive a user instruction,
   wherein the operation panel has a rectangular shape, and a longitudinal direction of the operation panel is a direction orthogonal to the direction of the conveyance path,
   wherein the area for reading the image of a moved original is arranged between the stationary original reading area and the operation panel,
   wherein the original conveying mechanism is configured to convey a document to be read which is larger than a maximum size document that is able to be read in the stationary original reading area,
   wherein a width of the conveyance path of the original conveying mechanism corresponds to the length in the direction of the length of the stationary original reading area and to the length in the direction of the length of the area for reading an image of a moved original, and
   wherein the original conveying mechanism and the operation panel are disposed on a first side of the image reading device, the operation panel is separately and independently provided adjacent to the original conveying mechanism, and the original conveying mechanism is configured to output the original to the original output portion toward a second side of the image reading device opposite the first side.

2. The image reading device according to claim 1, wherein the original placement portion and the original output portion are placed one on another, and the conveyance path is a U-turn path in which an original is conveyed from the original placement portion to the original output portion so as to be reversed.

3. The image reading device according to claim 1, wherein the original placement portion and the original output portion are disposed in positions opposed to each other with the area for reading an image of a moved original in between, and the conveyance path is a straight path in which an original is conveyed from the original placement portion to the original output portion.

4. The image reading device according to claim 1, wherein the line sensor is a contact image sensor that reads an intensity of reflected light from an original by light receiving elements arranged in a row, the length of the contact image sensor being substantially equal to the length of the stationary original reading area.

5. The image reading device according to claim 1, wherein on the stationary original reading area, an original of at least A4 size is configured to be placed with a direction of a length of the stationary original reading area and a direction of a length of the original as the same direction.

6. The image reading device according to claim 1, wherein the original conveying mechanism is configured to convey an original of at least A3 size with a direction of a length of the original as a conveyance direction.

7. The image reading device according to claim 1, wherein the cover member is provided with the original conveying mechanism, and the cover member is openably and closably provided on the original table so as to cover the stationary original reading area and the area for reading an image of a moved original.

8. The image reading device according to claim 1, wherein the cover member is openably and closably provided on the original table so as to cover only the stationary original reading area.

9. The image reading device according to claim 1, wherein the stationary original reading area and the area for reading an image of a moved original do not overlap.

10. The image reading device according to claim 1, wherein in the area for reading an image of a moved original, a moving original fed by an automatic document feeder is configured to be read.

11. An image reading device comprising:
    an original table having:
       a stationary original reading area that is rectangular when viewed two-dimensionally and where a transparent member is exposed from a top surface thereof, wherein a length of the stationary original reading area is longer than a width of the stationary original reading area; and
       an area for reading an image of a moved original where the transparent member is exposed along a direction of the length of the stationary original reading area;
    a line sensor provided inside the original table, and configured to move a reading line in a direction of the width of the stationary original reading area and configured to move the reading line to the area for reading an image of a moved original with the direction of the length of the stationary original reading area as the reading line;
    a cover member openably and closably provided on the original table so as to cover at least the stationary original reading area;
    an original conveying mechanism having a conveyance path leading from an original placement portion where an original to be read is placed by way of the area for reading an image of a moved original in a direction orthogonal to a direction of a length of the area for reading an image of a moved original to an original output portion where the original is outputted; and
    an operational panel configured to receive a user instruction, the operation panel being separately and independently provided adjacent to the original conveying mechanism,
    wherein the stationary original reading area and the area for reading an image of a moved original are located on a single substrate, wherein the operation panel has a rectangular shape, and a longitudinal direction of the operation panel is a direction orthogonal to the direction of the conveyance path, wherein the area for reading the image of a moved original is arranged between the stationary original reading area and the operation panel, wherein a width of the conveyance path of the original conveying mechanism corresponds to the length in the direction of the length of the stationary original reading area and to the length in the direction of the length of the area for reading an image of a moved original, and wherein the original conveying mechanism and the operation panel are disposed on a first side of the image reading device, the operation panel is separately and independently provided adjacent to the original conveying mechanism, and the original conveying mechanism is configured to output the original to the original output portion toward a second side of the image reading device opposite the first side.

12. The image reading device according to claim 11, wherein the original placement portion and the original output portion are placed one on another, and the conveyance path is a U-turn path in which an original is conveyed from the original placement portion to the original output portion so as to be reversed.

13. The image reading device according to claim 11, wherein the original placement portion and the original output portion are disposed in positions opposed to each other with the area for reading an image of a moved original in between, and the conveyance path is a straight path in which an original is conveyed from the original placement portion to the original output portion.

14. The image reading device according to claim 11, wherein the line sensor is a contact image sensor that reads an intensity of reflected light from an original by light receiving elements arranged in a row, the length of the contact image sensor being substantially equal to the length of the stationary original reading area.

15. The image reading device according to claim 11, wherein on the stationary original reading area, an original of at least A4 size is configured to be placed with a direction of a length of the stationary original reading area and a direction of a length of the original as the same direction.

16. The image reading device according to claim 11, wherein the original conveying mechanism is configured to convey an original of at least A3 size with a direction of a length of the original as a conveyance direction.

17. The image reading device according to claim 11, wherein the cover member is provided with the original conveying mechanism, and the cover member is openably and closably provided on the original table so as to cover the stationary original reading area and the area for reading an image of a moved original.

18. The image reading device according to claim 11, wherein the cover member is openably and closably provided on the original table so as to cover only the stationary original reading area.

19. The image reading device according to claim 11, wherein the stationary original reading area and the area for reading an image of a moved original do not overlap.

20. The image reading device according to claim 11, wherein in the area for reading an image of a moved original, a moving original fed by an automatic document feeder is configured to be read.

* * * * *